(12) United States Patent
Wang et al.

(10) Patent No.: US 11,391,877 B2
(45) Date of Patent: Jul. 19, 2022

(54) BACKLIGHT SOURCE AND MANUFACTURING METHOD THEREOF, AND DISPLAY DEVICE

(71) Applicant: BOE Technology Group Co., Ltd., Beijing (CN)

(72) Inventors: Wei Wang, Beijing (CN); Huijuan Wang, Beijing (CN); Yafeng Yang, Beijing (CN); Xiaochuan Chen, Beijing (CN); Xue Dong, Beijing (CN); Xiandong Meng, Beijing (CN); Xianqin Meng, Beijing (CN); Jifeng Tan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 918 days.

(21) Appl. No.: 16/301,481

(22) PCT Filed: Feb. 26, 2018

(86) PCT No.: PCT/CN2018/077233
§ 371 (c)(1),
(2) Date: Nov. 14, 2018

(87) PCT Pub. No.: WO2019/000987
PCT Pub. Date: Jan. 3, 2019

(65) Prior Publication Data
US 2021/0231858 A1  Jul. 29, 2021

(30) Foreign Application Priority Data
Jun. 30, 2017  (CN) .......................... 201710521671.6

(51) Int. Cl.
*F21V 8/00* (2006.01)
*G02B 5/18* (2006.01)

(52) U.S. Cl.
CPC ......... *G02B 6/0016* (2013.01); *G02B 5/1847* (2013.01); *G02B 5/1861* (2013.01);
(Continued)

(58) Field of Classification Search
CPC .. G02B 5/1847; G02B 5/1861; G02B 6/0016; G02B 6/0053; G02B 6/0055
See application file for complete search history.

(56) References Cited

U.S. PATENT DOCUMENTS 9,170,360 B2 * 10/2015 Watabe ................ G02B 6/0016
9,606,289 B2   3/2017 Chang
(Continued)

FOREIGN PATENT DOCUMENTS

CN    202303056 U    7/2012
CN    103032765 A    4/2013
(Continued)

OTHER PUBLICATIONS

First office action of Chinese application No. 201710521671.6 dated May 5, 2019.
(Continued)

*Primary Examiner* — Leah Simone Macchiarolo
(74) *Attorney, Agent, or Firm* — Fay Sharpe LLP

(57) ABSTRACT

A backlight source is provided which includes a light guide plate 10 and a light-emitting unit 20. The light guide plate 10 includes a first surface and a second surface disposed oppositely. The light-emitting unit 20 is located on the side of the light guide plate where the first surface disposed. The grating layer 30 includes at least one grating unit configured to diffract light emitted by the light-emitting unit 20. The overall structure of the backlight source is no longer limited by the distance between the LEDs and the first layer diffusion layer, and therefore the thinning and lightening of the (Continued)

backlight source is realized. A manufacturing method of a backlight source and a display device are further provided.

19 Claims, 20 Drawing Sheets

(52) U.S. Cl.
CPC ......... *G02B 5/1866* (2013.01); *G02B 6/0053* (2013.01); *G02B 6/0055* (2013.01); *G02B 6/0065* (2013.01)

(56) References Cited

U.S. PATENT DOCUMENTS

| | | | |
|---|---|---|---|
| 10,732,459 B2* | 8/2020 | Park | ................... H01L 25/0753 |
| 2005/0140258 A1 | 6/2005 | Leu et al. | |
| 2005/0195487 A1 | 9/2005 | Yu et al. | |
| 2008/0151142 A1* | 6/2008 | Noba | ................... G02B 6/0068 |
| | | | 349/65 |
| 2008/0158479 A1 | 7/2008 | Qi | |
| 2008/0278659 A1* | 11/2008 | Park | ................... G02B 6/0073 |
| | | | 349/65 |
| 2009/0086508 A1* | 4/2009 | Bierhuizen | .......... G02B 6/0021 |
| | | | 362/617 |
| 2009/0195729 A1* | 8/2009 | Little | ................... G02B 6/0053 |
| | | | 349/64 |
| 2016/0320541 A1 | 11/2016 | Kim | |
| 2018/0306960 A1* | 10/2018 | Zha | ....................... G02B 6/0016 |

FOREIGN PATENT DOCUMENTS

| | | |
|---|---|---|
| CN | 103226214 A | 7/2013 |
| CN | 103576385 A | 2/2014 |
| CN | 104763949 A | 7/2015 |
| CN | 105629563 A | 6/2016 |
| CN | 105700065 A | 6/2016 |
| CN | 206193278 U | 5/2017 |
| CN | 106896579 A | 6/2017 |
| TW | 200521562 A | 7/2005 |
| TW | 200530633 A | 9/2005 |

OTHER PUBLICATIONS

English translation of International Search Report dated Jun. 6, 2018 from PCT/CN2018/077233 as well as Chinese text.

* cited by examiner

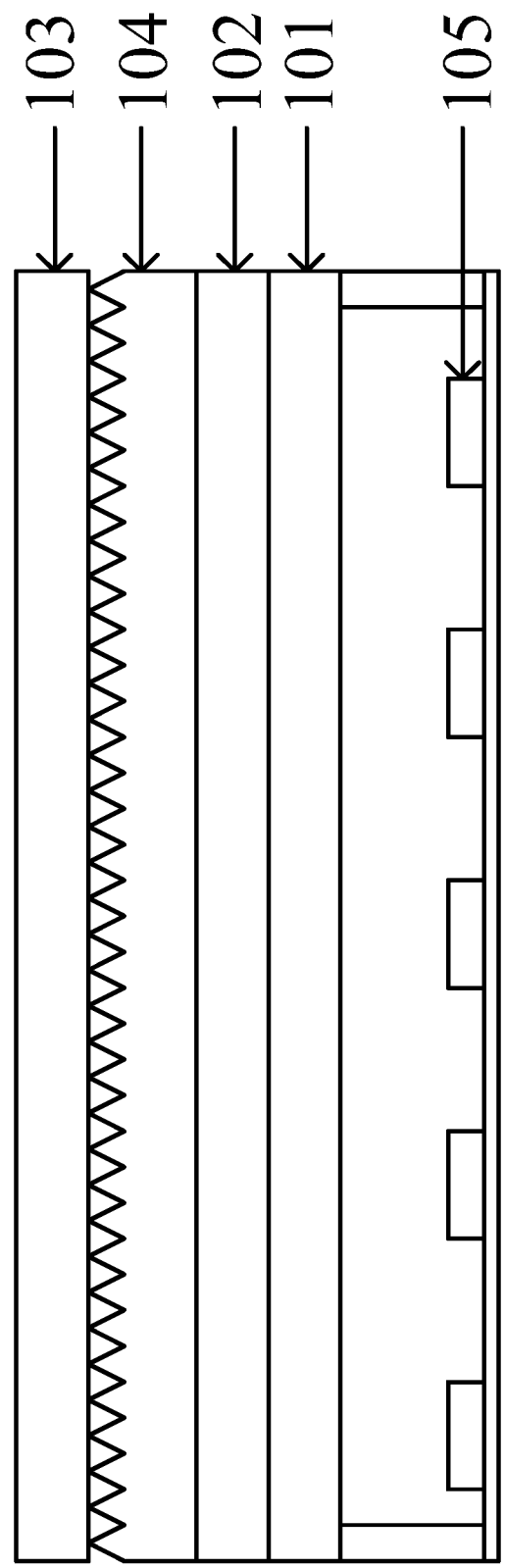

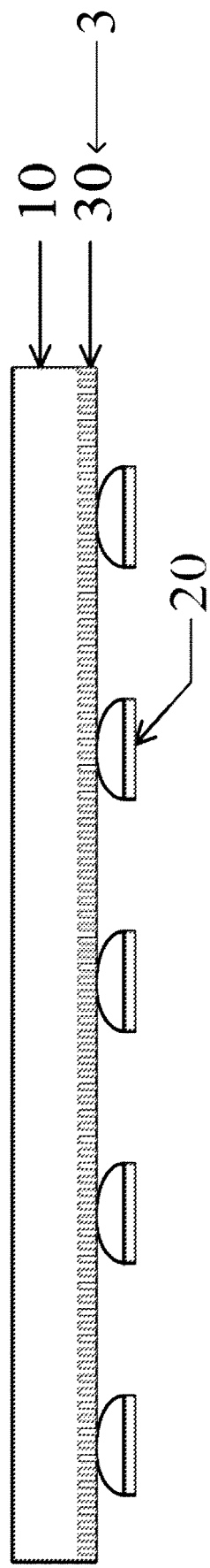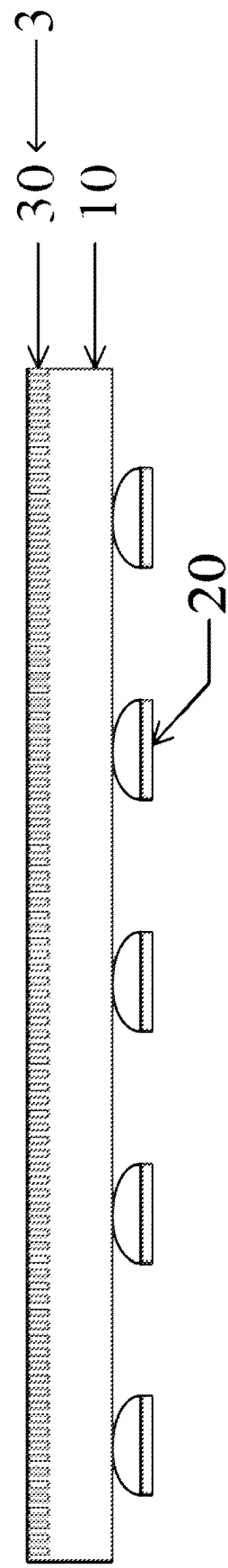

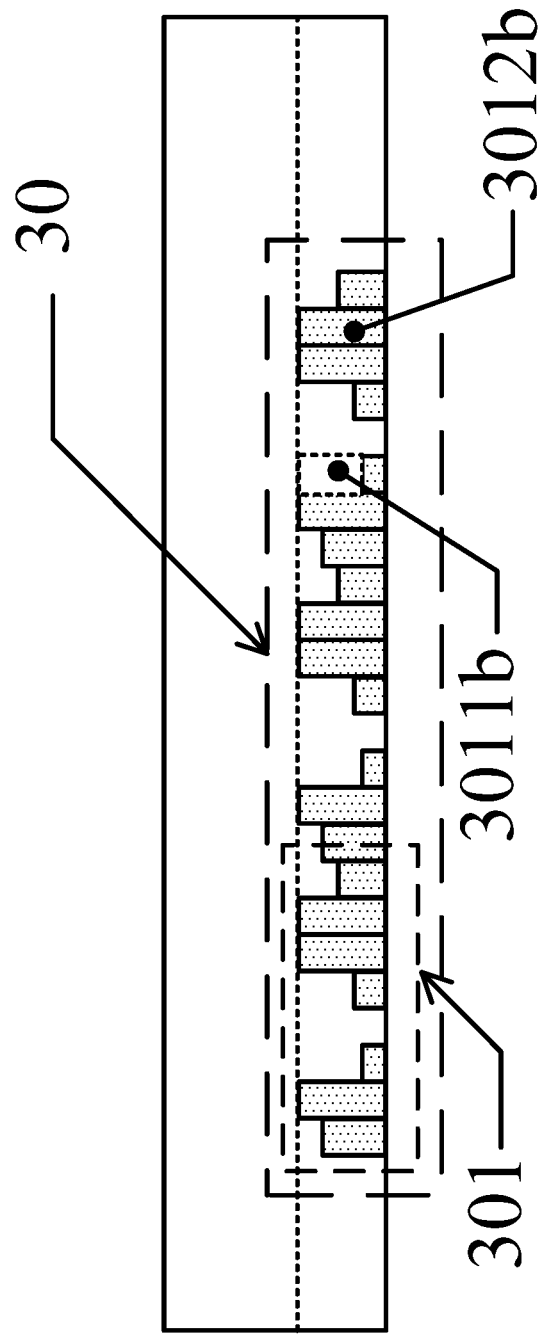

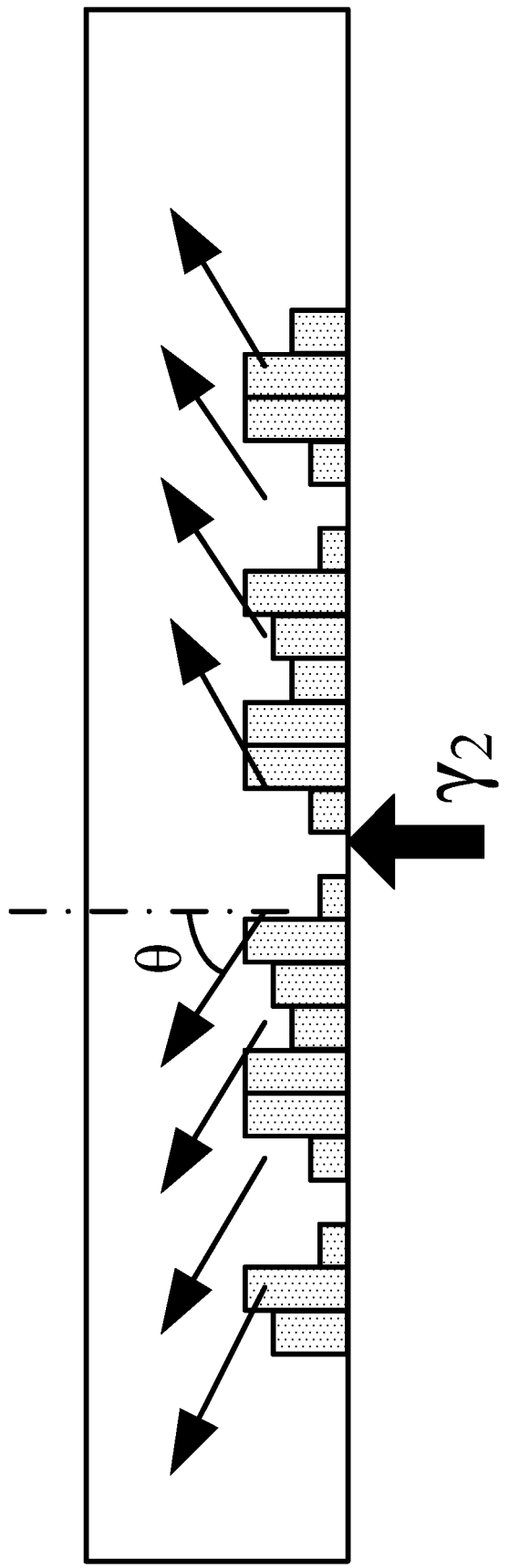

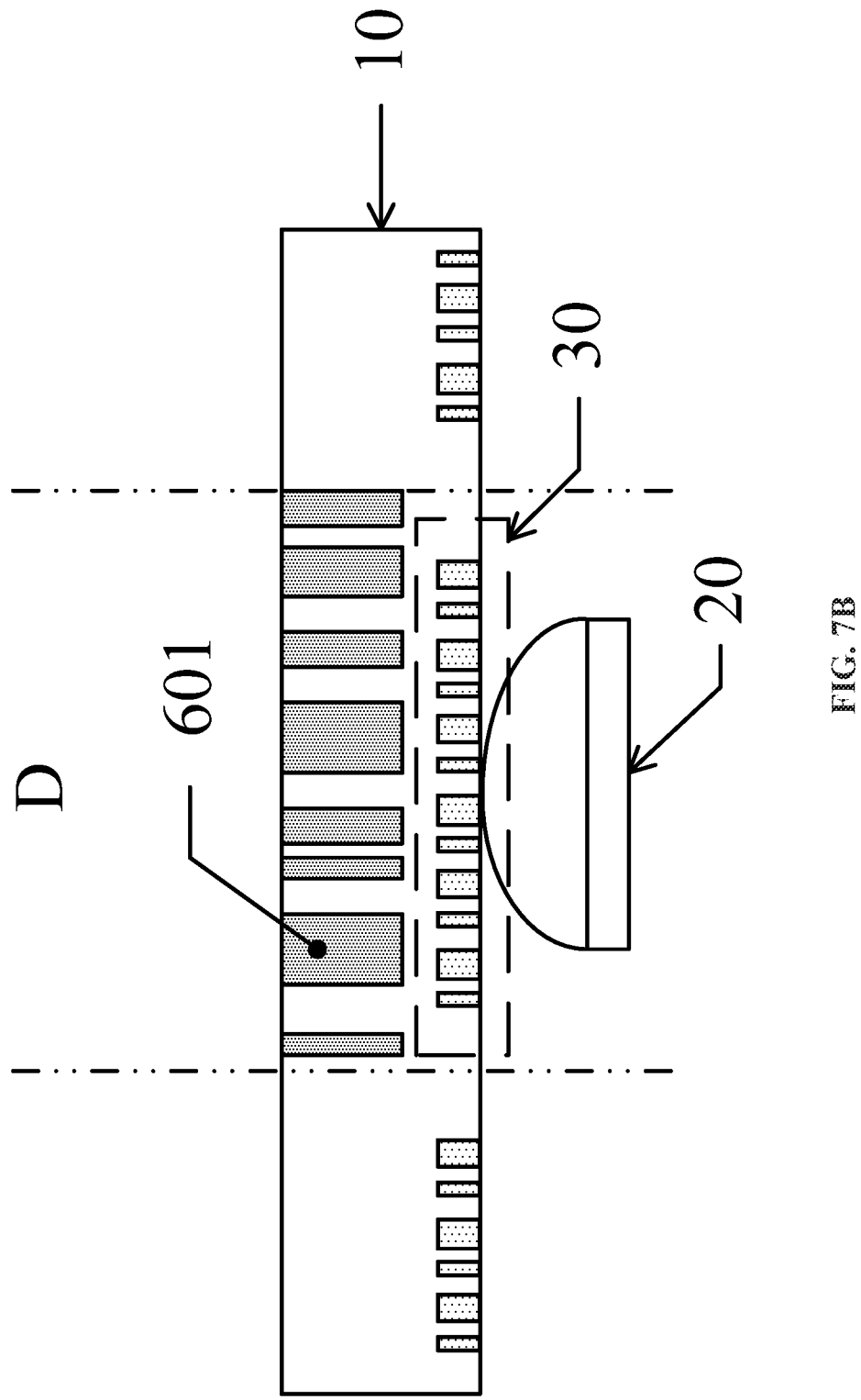

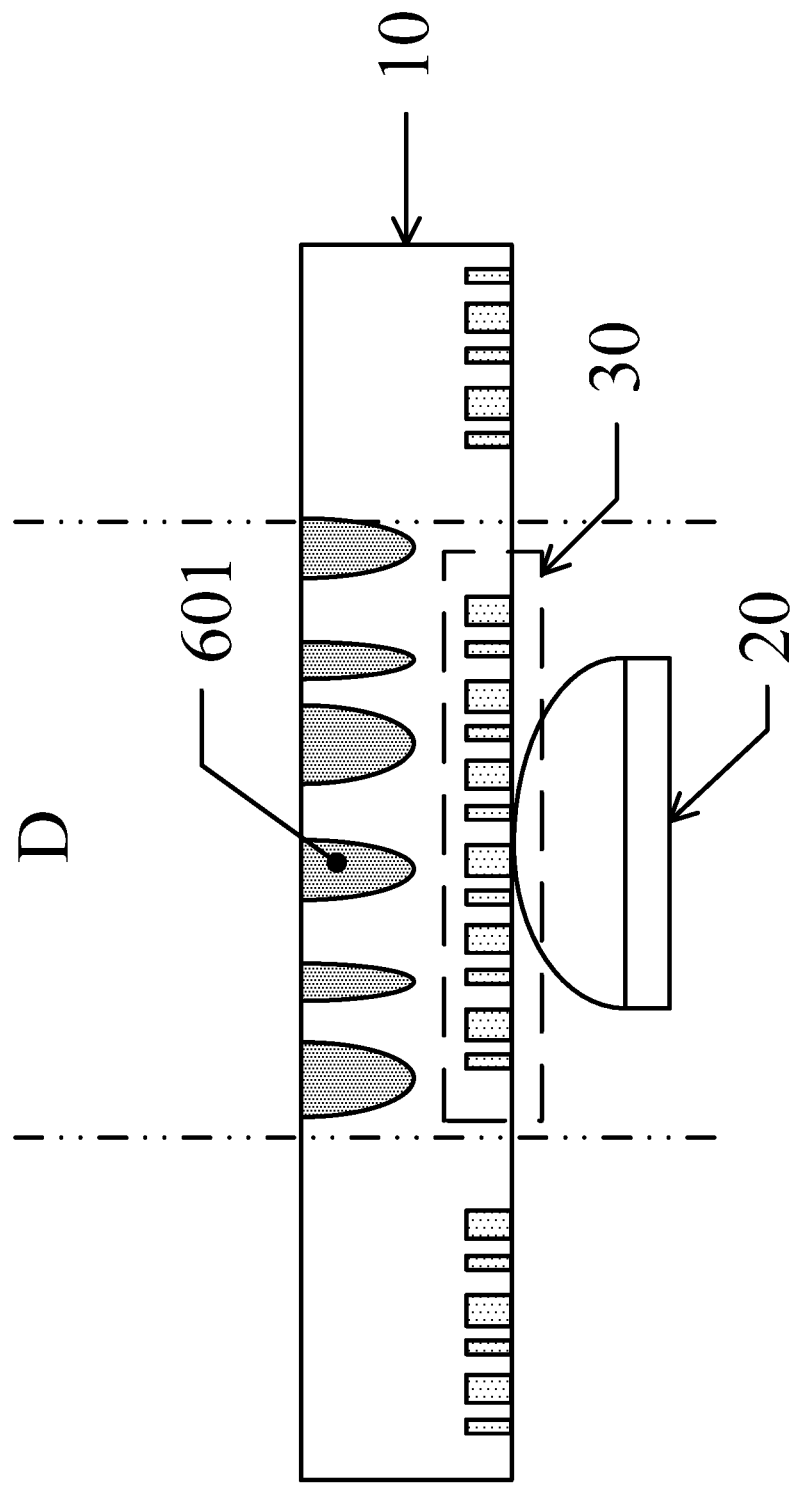

BACKLIGHT SOURCE AND MANUFACTURING METHOD THEREOF, AND DISPLAY DEVICE

This application is a 371 of PCT Patent Application Serial No. PCT/CN2018/077233, filed on Feb. 26, 2018, which claims priority to Chinese Patent Application No. 201710521671.6, filed on Jun. 30, 2017 and titled "BACKLIGHT SOURCE AND MANUFACTURING METHOD THEREFOR, AND DISPLAY DEVICE", the disclosure of which is incorporated herein by reference in its entirety.

TECHNICAL FIELD

The present disclosure relates to a backlight source and a manufacturing method thereof, and a display device.

BACKGROUND

A liquid crystal display (LCD) comprises a liquid crystal display panel and a backlight disposed on the back of the liquid crystal display panel. The existing backlight sources include edge-lit backlight sources and direct-lit backlight sources. Compared with the edge-lit backlight source, the direct-lit backlight source can be combined with a local dimming technology for regional dimming, so as to reduce the power consumption of the backlight source and improve the contrast of the display picture on the liquid crystal display.

However, the current direct-lit backlights cannot achieve thinning and lightening.

SUMMARY

The present disclosure provides a backlight source and a manufacturing method thereof, and a display device. The technical solutions are as follows.

In a first aspect, there is provided a backlight source, comprising:

a light guide plate, including a first surface and a second surface which are disposed opposite to each other;

a light-emitting unit, being located on the side of the light guide plate where the first surface is disposed; and a grating layer, including at least one grating unit configured to diffract light emitted by the light-emitting unit, to enable part of the diffracted light to be transmitted in the waveguide mode of total-reflection in the light guide plate.

Optionally, the backlight source comprises a plurality of light-emitting units, the grating layer comprises a plurality of grating units, and the plurality of grating units and the plurality of light-emitting units are in one-to-one correspondence.

Optionally, an orthogonal projection, on the first surface of the light guide plate, of each of the light-emitting units is within an orthogonal projection, on the first surface of the light guide plate, of the corresponding grating unit.

Optionally, the grating layer is on the first surface of the light guide plate, and the grating unit is a transmission grating unit.

Optionally, the light-emitting unit is attached to the grating unit.

Optionally, the grating layer is on the second surface of the light guide plate, and the grating unit is a reflective grating unit.

Optionally, the light-emitting unit is attached to the first surface of the light guide plate.

Optionally, the grating unit comprises a plurality of sub-grating groups, and each of the plurality of sub-grating groups comprises a plurality of prism structures.

Optionally, the grating unit comprises a plurality of sub-grating groups which are arranged periodically, and each of the sub-grating groups comprises one of the following two structures:

a plurality of prism structures having at intervals, and the same height in a direction perpendicular to the first surface of the light guide plate; and a plurality of prism structures, being attached to each other to form a stepped structure, and having the same width in a direction parallel with the first surface of the light guide plate.

Optionally, the grating layer and the light guide plate are of an integral structure.

Optionally, the backlight source further comprises: a uniform light-emergent component on at least one of the first surface and the second surface of the light guide plate.

Optionally, the uniform light-emergent component comprises a plurality of mesh points with intervals; and a cross section, perpendicular to the first surface of the light guide plate, of the mesh points is on the shape of rectangular, triangular and semi-elliptical.

Optionally, the backlight source further comprises: a base substrate, and the light-emitting unit is fixed on a side of the base substrate close to the light guide plate.

Optionally, the backlight source further comprises: a reflecting layer and an optical film layer, the reflecting layer is on one of the positions of a side of the base substrate away from the light guide plate, and on one of the following layer: the same layer as the light-emitting unit and different layer with the light-emitting unit; and the optical film layer is on the second surface of the light guide plate.

In a second aspect, there is provided a method for manufacturing a backlight source, comprising:

providing a light guide plate including a first surface and a second surface which are disposed oppositely;

forming a light-emitting unit on a side of the first surface of the light guide plate; and forming a grating layer based on the light guide plate, the grating layer including at least one grating unit configured to diffract light emitted by the light-emitting unit, to enable part of the diffracted light to be transmitted in the waveguide mode of total-reflection in the light guide plate.

Optionally, the backlight source comprises a plurality of light-emitting units, the grating layer comprises a plurality of grating units, and the plurality of grating units and the plurality of light-emitting units are in one-to-one correspondence.

Optionally, forming a grating layer based on the light guide plate comprises: disposing the grating layer on the first surface of the light guide plate, the grating unit being a transmission grating unit.

Optionally, wherein forming a grating layer based on the light guide plate comprises: forming the grating layer on the light guide plate by one of the following modes: transfer printing and imprinting.

Optionally, forming a grating layer based on the light guide plate comprises: disposing the grating layer on the second surface of the light guide plate, the grating unit being a reflective grating unit Optionally, after providing a light guide plate, the method further comprises: forming a uniform light-emergent component on at least one of the first surface and the second surface of the light guide plate.

In a third aspect, there is provided a display device, comprising a backlight source, wherein the backlight source comprises: a light guide plate including a first surface and a second surface which are opposite to each other; a light-emitting unit on a side of the first surface of the light guide plate; and a grating layer including at least one grating unit configured to diffract light emitted by the light-emitting unit, to enable part of the diffracted light to be transmitted in the waveguide mode of total-reflection in the light guide plate.

BRIEF DESCRIPTION OF THE DRAWINGS

FIG. 1 is a schematic diagram of a structure of an existing direct-lit backlight source capable of performing regional dimming;

FIG. 2A is a schematic diagram of a structure of a backlight source provided in an embodiment of the present disclosure;

FIG. 2B is a schematic diagram of a structure of another backlight source provided in an embodiment of the present disclosure;

FIG. 4A is a schematic diagram of a structure of another grating unit provided in an embodiment of the present disclosure;

FIG. 4B is a schematic diagram of diffraction of the grating unit shown in FIG. 4A for the incident light;

FIG. 7B is a schematic diagram of a structure of a mesh point provided in an embodiment of the present disclosure;

FIG. 7D is a schematic diagram of a structure of yet another mesh point provided in an embodiment of the present disclosure;

DETAILED DESCRIPTION

Figure 2C:
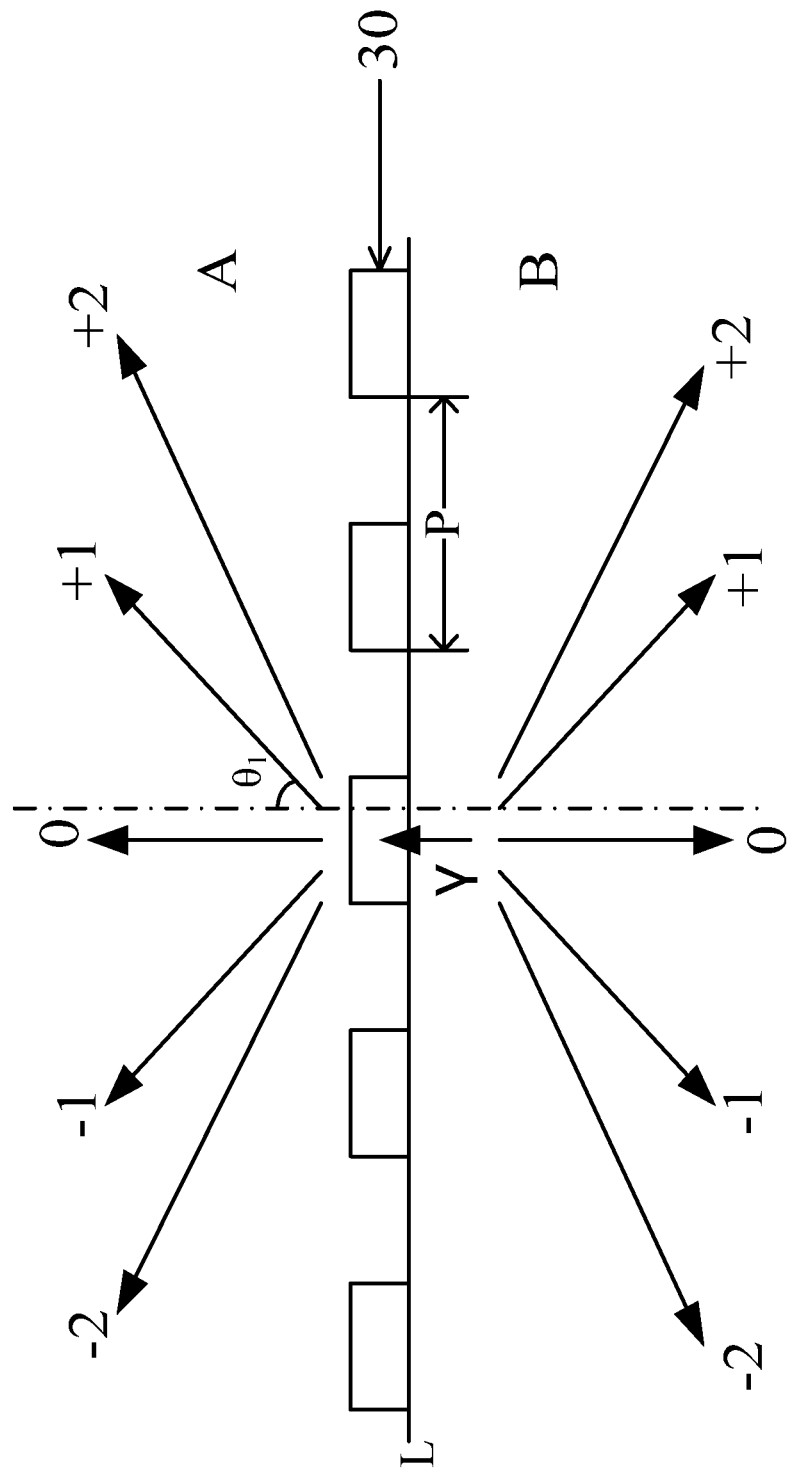
FIG. 2C is a schematic diagram of a diffracted waves of respective orders of a grating.

The present disclosure will be described in further detail with reference to the drawings, to clearly present the principles, and advantages of the present disclosure.

At present, the direct-lit backlight source capable of performing regional dimming is as shown in FIG. 1, and comprises a first layer diffusion sheet 101, a second layer diffusion sheet 102, and a third layer diffusion sheet 103. The direct-lit backlight further comprises a prism film layer 104 located between the second layer diffusion sheet 102 and the third layer diffusion sheet 103, and a plurality of light-emitting diodes 105 (LEDs) located on a light-incident surface of the first layer diffusion sheet 101 in matrix arrangement. The prism film layer may adjust the light-emergent uniformity and light-emergent angle of the LEDs to some extent. In order to make the light emitted by the direct-lit backlight source to be uniform, usually, when the LEDs are disposed, there exists a certain distance between a light-emitting surface of the LEDs and the first layer diffusion sheet, so as to ensure that the light emitted by the adjacent LEDs can be subjected to light mixing in a direction perpendicular to the light-incident surface of the first layer diffusion sheet and the light is uniformized before entering the first layer diffusion sheet. Therefore, the optical quality of the backlight source is ensured.

However, in the direct-lit backlight source, since the certain distance needs to be ensured between the LEDs and the first layer diffusion sheet, and the overall structure of the backlight source is limited by the distance between the LEDs and the first layer diffusion layer, the thinning and lightening of the direct-lit backlight source cannot be realized.

The embodiment of the present disclosure provides a backlight source, as shown in FIG. 2A. The backlight source may be a direct-lit backlight source, and the backlight source may comprise: a light guide plate 10, wherein the light guide plate 10 comprises a first surface and a second surface disposed oppositely, the first surface may be a light-incident surface of the light guide plate 10, the second surface may be a light-emergent surface of the light guide plate 10, the first surface and the second surface are two parallel surfaces, and both of them are the two surfaces having the largest surface area of the light guide plate 10; a light-emitting unit 20, located on the side of the light guide plate where the first surface disposed; and a grating layer 3, comprising at least one grating unit 30, which is configured to diffract the light emitted by the light-emitting unit 20.

Optionally, a light-emitting surface of the light-emitting unit 20 may be attached to the first surface of the light guide plate 10. The plurality of light-emitting units is sparsely arranged in array. The distribution density of the plurality of light-emitting units is uniform to ensure the light-emitting uniformity of the backlight source. For example, the plurality of light-emitting units may be arranged in matrix, or the plurality of light-emitting units are arranged in the shape of multiple equilateral triangles arranged in array, and each light-emitting unit is located on the apex of one equilateral triangle.

Herein, the first or second surface of the light guide plate 10 is provided with the grating layer 3. For example, as shown in FIG. 2A, the first surface (i.e., the light-incident surface) of the light guide plate 10 may be provided with the grating layer 3. The backlight source may comprise a plurality of light-emitting units 20. The light emitted by the plurality of light-emitting units 20 can diffract when passing through the grating unit 30, and part of the diffracted light is transmitted in a waveguide mode of total-reflection (the waveguide mode refers to the mode in which the light is transmitted in an optical waveguide) in the light guide plate 10.

It should be noted that the refractive index of the light guide plate is greater than the refractive index of a film layer adjacent to the light guide plate. The material of the light guide plate may be resin or glass. The thickness of the light guide plate may be 0.1 to 2 mm.

In summary, according to the backlight source provided by the embodiment of the present disclosure, the grating layer is disposed on the light guide plate, and the grating layer comprises at least one grating unit. The light emitted by the light-emitting unit can diffract when passing through the grating unit. Part of the diffracted light is transmitted in the waveguide mode of total-reflection in the light guide plate, so that the grating unit can be combined with the light guide plate to realize uniformization of the light. Since the grating unit can efficiently couple the light emergent from the light-emitting unit in the direction perpendicular to the first surface of the light guide plate into the light guide plate for transversely light mixing, that is, the light is mixed in a direction parallel to the first surface of the light guide plate. In the related art, the light is mixed in the direction perpendicular to the light-incident surface of the first layer diffusion sheet. Therefore, compared with the related art, the present disclosure can effectively reduce the distance between the light-emitting surface of the light-emitting unit and the light guide plate. For example, the light-emitting surface of the light-emitting unit can be attached to the first surface of the light guide plate, and thus the distance between the light-emitting surface of the light-emitting unit and the second surface of the light guide plate, i.e., the distance for mixing light, may be effectively reduced. Therefore, based on light uniformity, the overall structure of the backlight source is no longer limited by the distance between the light-emitting unit and the light guide plate, and the lightening and thinning of the backlight source are realized.

It should be noted that the grating layer provided by the embodiment of the present disclosure can be directly formed on the light guide plate body, that is, the light guide plate comprises the grating layer, and the grating layer and the light guide plate are of an integrated structure. Forming the grating layer on the light guide plate body can further reduce the overall thickness of the backlight source, thereby improving the lightness and thinness of the backlight source. In addition, the grating layer can also be prepared by using a separate film layer and disposed on the light guide plate, which is not limited in the present embodiment of the present disclosure. The embodiment of the present disclosure takes the grating unit 30 of the grating layer which is formed on the light guide plate body as an example for explanation.

In the embodiments of the present disclosure, the grating unit can make the light emitted by the light-emitting unit to diffract when the light passes through the grating unit, so that the diffracted light is transmitted in the waveguide mode of total-reflection in the light guide plate. That is, the grating unit is configured to diffract the light emitted by the light-emitting unit. In order to efficiently convert the light emitted by the light-emitting unit into the light in the waveguide mode, in the embodiment of the present disclosure, the grating unit is required to have higher diffraction efficiency at a larger diffraction angle (i.e., the diffraction angle needs to satisfy that the diffracted light can be totally reflected in the light guide plate). Wherein, the principle of total reflection is that when the incident light is incident into an emergent medium from an incident medium, if the incident angle $\beta$ of the incident light satisfies that $\sin \beta$ is greater than or equal to the refractive index of the emergent medium/the refractive index of the incident medium, and the incident light is totally reflected. For example, when the incident light is incident to the air medium having a refractive index of 1 from the medium having a refractive index of 1.5, if the incident angle of the incident light is greater than or equal to 42 degrees, the incident light is totally reflected.

As shown in FIG. 2A, when the grating unit is disposed on the light-incident surface of the light guide plate 10 (i.e., the grating layer 3 is disposed on the first surface of the light guide plate 10), the grating unit is a transmission grating unit. The transmission diffraction order of the grating unit can be adjusted, so that the diffraction angle meets the requirement that the light is transmitted in the waveguide mode of total-reflection in the light guide plate. In this case, the light-emitting unit can be attached to the grating unit. As shown in FIG. 2B, when the grating unit 30 is disposed on the light-emergent surface of the light guide plate 10 (i.e., the grating layer 3 is disposed on the second surface of the light guide plate 10), the grating unit is a reflective grating unit. The reflection diffraction order of the grating unit can be adjusted, so that the diffraction angle meets the requirement that the light is transmitted in the waveguide mode of total-reflection in the light guide plate. In this case, the light-emitting unit is attached to the first surface of the light guide plate. 20 in FIG. 2A and FIG. 2B is the light-emitting unit.

Herein, FIG. 2C is a schematic diagram of the diffracted waves of respective orders of the grating. With the setting interface L of the grating unit 30 as a boundary, the region where the diffracted waves located is divided into two parts, namely, region A and region B, that is, the upper and lower parts in FIG. 2C. The diffracted waves in the region A are transmitted waves (the transmitted waves are diffracted waves of the transmission grating unit) and the medium in the region A is a transmission medium. The diffracted waves in the region B are reflected waves (the reflected waves are diffracted waves of the reflective grating unit), and the medium in the area B is an incident medium. The relationship of the diffraction angle $\theta$ of the m-order diffracted waves of the grating (i.e., the diffraction order of the grating is m) and the grating period P, the wavelength $\lambda$ of the incident light $\gamma$, and the incident angle $\theta 0$ of the grating unit 30 is as follows.

When the diffracted waves are transmitted waves, the relationship corresponds to the formula (1): $n2 \sin \theta - n1 \sin \theta 0 = m\lambda/P$ (m=0, 1, 2, . . . ) . . . formula (1).

When the diffracted waves are reflected waves, the relationship corresponds to the formula (2): $n1 \sin \theta - n1 \sin \theta 0 = m\lambda/P$ (m=0, 1, 2, . . . ) . . . formula (2).

n1 is the refractive index of the incident medium, and n2 is the refractive index of the transmission medium. In general, the diffraction intensity of the diffracted waves having a diffraction order of 0 and/or 1 is relatively large. In FIG. 2C, the incident angle θ0 is equal to 0 (the incident angle θ0 is not marked in FIG. 2C). As shown in FIG. 2C, the 0-order diffracted waves are transmitted along the direction of the incident light (transmitted waves) or along the opposite direction of the incident light (reflected waves). The diffraction angle of the 1-order transmitted waves is θ1. The diffraction angle of the diffracted waves of a higher order (i.e., the diffraction order is greater than or equal to 1)) can be regulated by the grating period.

The following embodiment of the present disclosure takes the fact that the diffracted waves are transmitted waves, that is, the grating unit is disposed on the first surface (i.e., the light-incident surface) of the light guide plate as an example for explanation. When the diffracted waves are reflected waves, that is, when the grating unit is disposed on the second surface (i.e., the light-emergent surface) of the light guide plate, the specific design of the grating unit may refer to the design of the grating unit when the diffracted waves are the transmitted waves, which is not repeated in detail by the embodiment of the present disclosure.

Figure 2D:
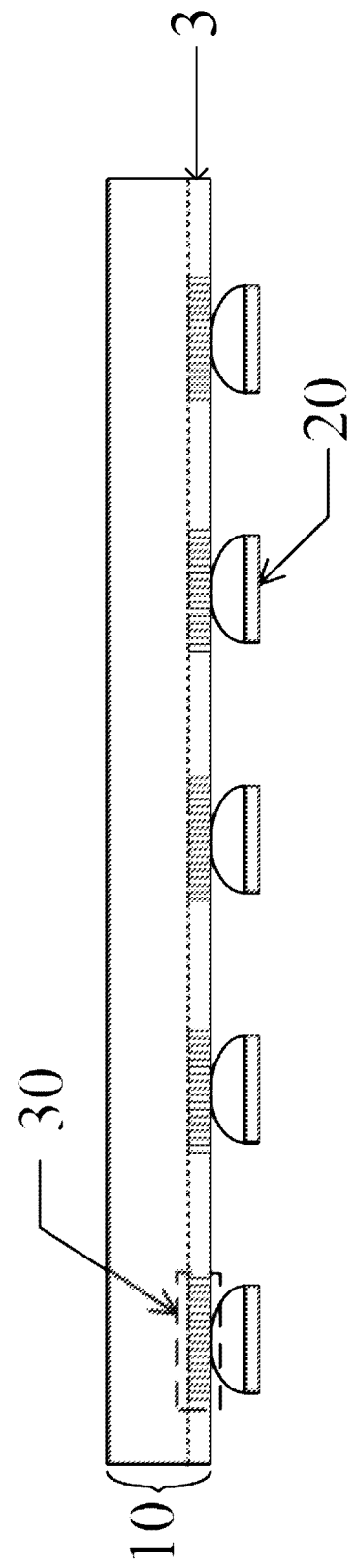
FIG. 2D is a schematic diagram of a structure of yet another backlight source provided in an embodiment of the present disclosure.

Optionally, the grating layer 3 may be a whole layer structure as shown in FIG. 2A or 2B, that is, the grating layer comprises a grating unit 30 disposed on a whole layer. As shown in FIG. 2D, the backlight source may also comprise a plurality of light-emitting units 20, and the grating layer 3 comprises a plurality of grating units 30. The plurality of grating units 30 and the plurality of light-emitting units 20 are in one-to-one correspondence. The grating units are disposed in the positions of the light guide plate 10 corresponding to the light-emitting units 20, thereby reducing the degree that the incident light escapes from the first surface of the light guide plate, and improving the light-emergent efficiency of the backlight source.

Figure 2E:
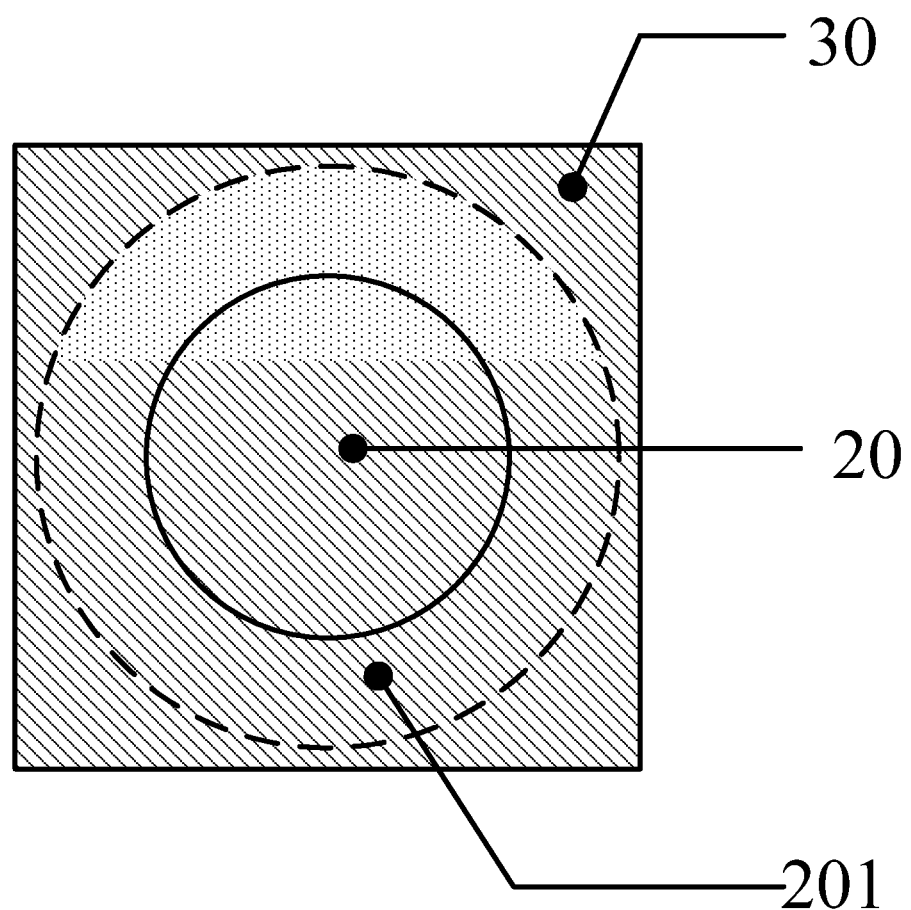
FIG. 2E is a top view of a group of grating units and light-emitting units which are disposed correspondingly in FIG. 2D.

The orthogonal projection, on the first surface of the light guide plate, of each light-emitting unit is located in the orthogonal projection, on the first surface of the light guide plate. of the corresponding grating unit. FIG. 2E is a top view of a group of grating units and light-emitting units which are disposed correspondingly in FIG. 2D. As shown in FIG. 2E, the center of the orthogonal projection, on the first surface of the light guide plate, of each light-emitting unit 20 and that of the orthogonal projection of the corresponding grating unit 30 overlaps, and the area of the orthogonal projection, on the first surface of the light guide plate, of the grating unit 30 is greater than the area of an illuminating region 201, on the first surface of the light guide plate, (the region within the dotted circle in FIG. 2E) of the light emitted by the light-emitting unit 20, such that each grating unit couples the light emitted by the corresponding light-emitting unit into the light guide plate better.

Figure 2F:
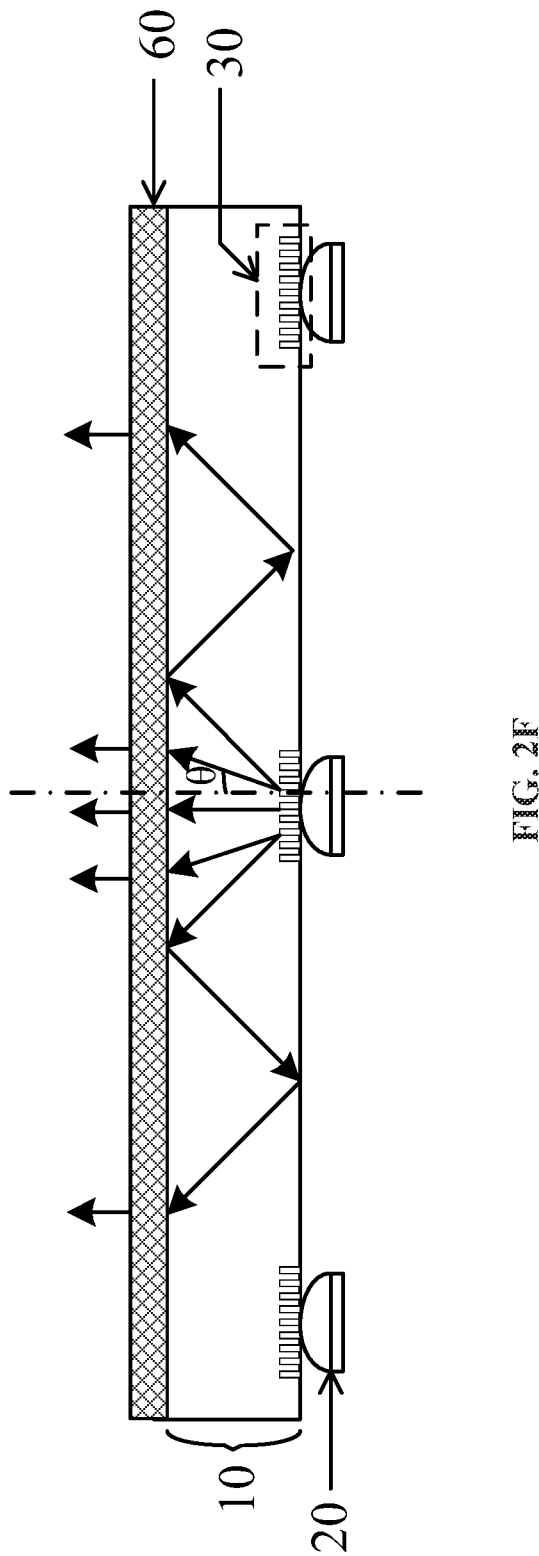
FIG. 2F is a schematic diagram of light transmission of part of the structure of the backlight source shown in FIG. 2D.

Exemplarily, FIG. 2F is a schematic diagram of light transmission of the partial structure of the backlight source shown in FIG. 2D. As shown in FIG. 2F, after the light emitted by the light-emitting unit 20 diffracts when passing through the grating unit 30, the light having the diffraction angle θ greater than or equal to a total reflection angle (the total reflection angle is the critical angle at which the light is totally reflected) is transmitted in the waveguide mode in the light guide plate 10, and the light having the diffraction angle θ less than the total reflection angle is emergent from the second surface of the light guide plate. The light is uniformized by other film layer(s) disposed on the side of the second surface of the light guide plate.

Figure 2G:
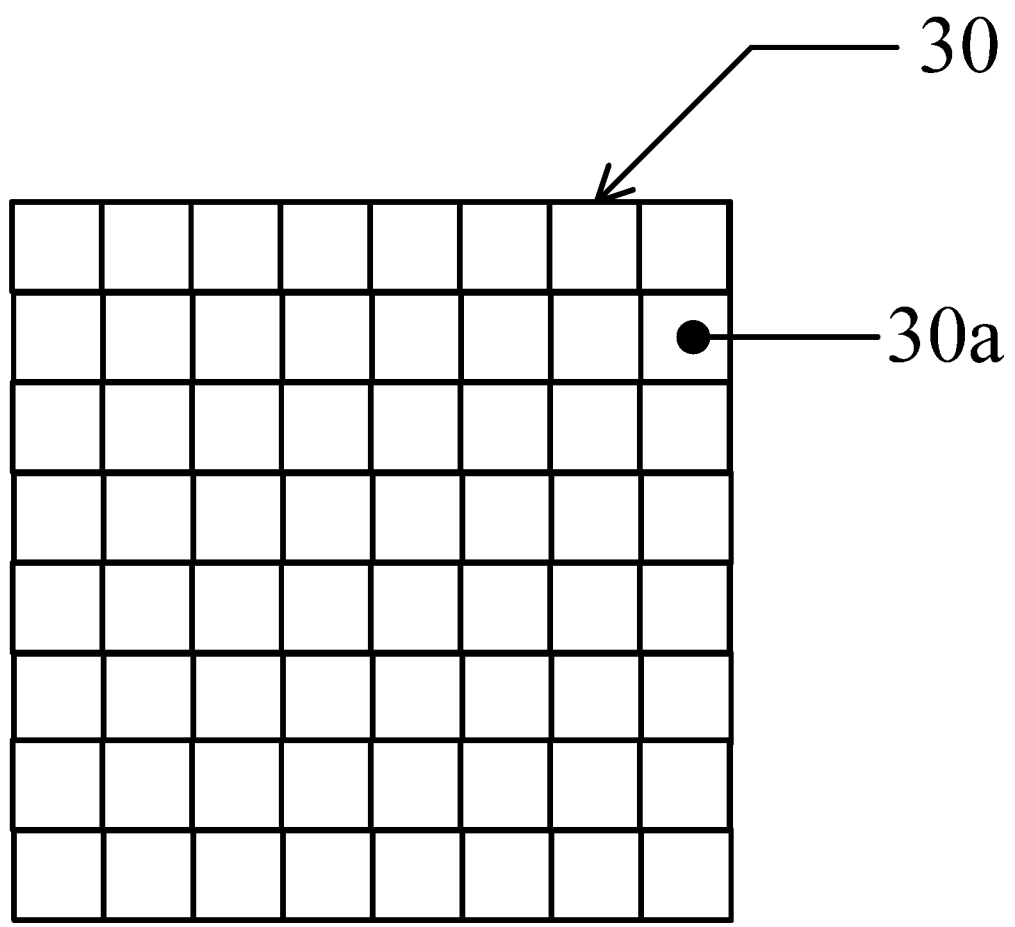
FIG. 2G is a schematic diagram of distribution of sub-grating groups in a grating unit provided in an embodiment of the present disclosure.

Optionally, each grating unit may comprise a plurality of sub-grating groups, and each sub-grating group may comprise a plurality of prism structures. As shown in FIG. 2G, each grating unit 30 can be divided into a plurality of modules 30a, and the sub-grating groups in each module 30a can be respectively designed according to different incident angles and brightness of the incident light in the region, thereby further improving the uniformity of the emergent light of the backlight source.

Optionally, in the above transmission grating unit and reflective grating unit, the sub-grating groups in each grating unit may be arranged periodically, and the plurality of sub-grating groups may be arranged in parallel, or may be circumferentially arranged with the center of the orthogonal projection, on the first surface of the light guide plate, of the light-emitting unit as the circle center. The arrangement manner of the sub-grating groups is not limited in the embodiment of the present disclosure.

In practical application, the grating unit comprising the periodically arranged sub-grating groups may have various structures. Exemplarily, each sub-grating group comprises either one of the following two structures: the first structure: a plurality of prism structures disposed at intervals, wherein the plurality of prism structures has the same height, and the height is in a direction perpendicular to the first surface of the light guide plate; the second structure: a plurality of prism structures, wherein the plurality of prism structures is attached to each other to form a stepped structure, the prism structures have the same width, and the width is in a direction parallel with the first surface of the light guide plate. Each prism structure is a closed geometry which is formed by two parallel planes being vertically cut by at least three planes, wherein the two parallel planes are bottom surfaces, and the at least three planes are side surfaces. In the embodiment of the present disclosure, the prism structures are straight prism structures, which can be classified into rectangular parallelepiped structures (i.e., the bottom surface is rectangular) and inclined prism structures (i.e., the bottom surface is non-rectangular) according to whether the bottom surface thereof is rectangular. Hereinafter, the following embodiment of the present disclosure takes the following three types of grating units as an example for explanation, which comprises the following.

Figure 3A:
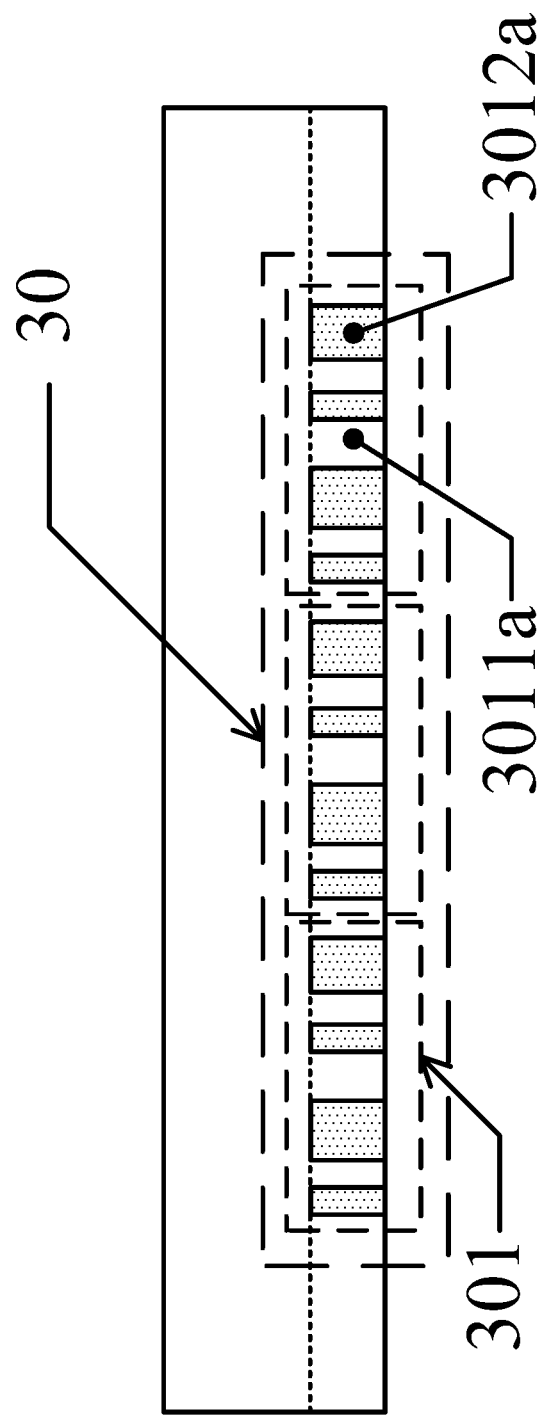
FIG. 3A is a schematic diagram of a structure of a grating unit provided in an embodiment of the present disclosure.

For the first type of grating unit, FIG. 3A is a schematic structural diagram of one grating unit 30. As shown in FIG. 3A, each grating unit 30 comprises a plurality of sub-grating groups 301, and each sub-grating group 301 comprises a plurality of prism structures 3011a disposed at intervals. The plurality of prism structures 3011a has the same height. The height of the prism structures 3011a is also the thickness of the grating unit, and the height is in a direction perpendicular to the first surface of the light guide plate. As shown in FIG. 3A, each prism structure is a quadrangular structure of which the cross section is rectangular, that is, the prism structure 3011a is of a rectangular parallelepiped structure.

Herein, a gap between any two adjacent prism structures 3011a of the plurality of prism structures is provided with a filler 3012a, and the refractive index of the filler is less than the refractive index of the prism structure. The filler is generally a resin material, and the refractive index is adjusted by adjusting the molecular composition of the resin material. Or nanoparticles with high-refractive index (i.e., the refractive index is greater than the preset refractive index threshold) or low-refractive index (i.e., the refractive index is less than the preset refractive index threshold) are added in a certain resin base material to adjust the refractive index. The function of the grating can be achieved by the difference between the refractive indexes of the filler and the prismatic structure. When the filler having a large difference in refractive index from the prism structure is disposed in the gap, the grating unit is lightened and thinned and the diffraction efficiency of the grating unit for the incident light can be ensured.

Optionally, the height of each prism structure is generally less than 2 μm, that is, the thickness of the grating unit is generally less than 2 μm. For example, the thickness of the grating unit is 100 nm to 500 nm, and the thickness can be adjusted according to at least one of the actual demand on the diffraction efficiency, the refractive index of the prism structure, and the refractive index of the filler.

Exemplarily, the height h1 of the prism structure may be calculated by a first calculation formula or a second calculation formula, the first calculation formula is $n_1*h_1=\lambda/m$, and the second calculation formula is $(n_1-n_2)*h_1=\lambda/m$, wherein n1 is a refractive index of the prism structure, n2 is the refractive index of the filler, λ is the wavelength of the light emitted by the light-emitting unit, m is an integer greater than 0, and m is generally selected from 1 or 2.

In the plurality of prism structures 3011a disposed at intervals as shown in FIG. 3A, there is a gap between two adjacent prism structures. The number of the gaps in each grating unit, the minimum width of the gap, and the minimum width of the prism structure can be determined according to technical implementing conditions, wherein the width of each gap and the width of the prism structure can be optimized by software.

In practical application, the widths of the plurality of gaps in the grating unit may be different, and the relationship between the width of each gap and the thickness of the grating unit (i.e., the height of the prism structure) may satisfy that the ratio of the thickness of the grating unit to the width of the gap is 0.2 to 5. The width of the plurality of prism structures in the grating unit may also be different. The relationship between the width of each prism structure and the thickness of the grating unit may satisfy that the ratio of the thickness of the grating unit to the width of the prism structure is 0.2 to 5.

Optionally, as shown in FIG. 3A, one grating unit 30 comprises three sub-grating groups 301, and each sub-grating group 301 has a width of 1 to 2 μm, that is, one grating period in the grating unit is 1 to 2 μm. It should be noted that the grating period may also be 2 to 100 μm to ensure that the grating unit can have a sufficient number of gaps in each grating period to adjust the diffraction angle of the incident light. The larger the grating period is, the higher the required diffraction order is. The selection of the specific diffraction order can be obtained by the above formula (1).

Exemplarily, the design process and the optimization process of the first type of grating unit 30 may comprise the following steps.

S11. Environmental parameters are determined.

The environmental parameters are used to optimize a preset target to obtain attribute parameters of the grating unit, and the attribute parameters may comprise a width of the gap and a width of the prism structure. The preset target may be the diffraction order and the optical variable of the grating unit, the wavelength of the transmitted waves, etc.

Exemplarily, the environmental parameters may be set as follows: the refractive index of the incident medium is 1, the refractive index of the transmission medium (i.e., the light guide plate) is 1.5, the grating period is 1.6 μm, the thickness of the grating unit is 450 nm, and the number of the gaps within one grating period is 4.

S12. A target to be optimized is determined.

For example, the diffraction order may be selected to be 4-order, and the corresponding diffraction angle is about 49 degrees. The optical variable is the transmission coefficient of the diffraction corresponding to the transmitted waves. The wavelength range of the transmitted waves is 450 nm, and the incident angle is 0 degree. The polarized light is transverse electric (TE) polarized light, transverse magnetic (TM) polarized light, partially polarized light and unpolarized light, etc.

S13. A simulation algorithm and an optimization algorithm are selected.

The selected simulation algorithm may be any one of a rigorous coupled wave analysis algorithm, a time domain finite difference algorithm, and a finite element algorithm. The selected optimization algorithm may be any one of a genetic algorithm, a simulated annealing algorithm and a bee colony algorithm.

S14. Optimized results are output

For example, the parameters set in the above S11, and the TE polarized light and the TM polarized light set in S12 are adopted for simulation based on the rigorous coupled wave analysis algorithm selected by S13 and for optimization based on the genetic algorithm selected by S13. The obtained optimized results are as shown in Table 1.

TABLE 1

| Number of gaps | Grating period | Diffraction order | Diffraction angle | Diffraction efficiency |
|---|---|---|---|---|
| 4 | 1.6 μm (TE polarized light) | −5 | 69.64 | 2.21% |
| | | −4 | 48.59 | 13.86% |
| | | −3 | 34.23 | 0.41% |
| | | −2 | 22.02 | 2.57% |
| | | −1 | 10.81 | 10.70% |
| | | 0 | 0.00 | 2.09% |
| | | 1 | −10.81 | 9.34% |
| | | 2 | −22.02 | 1.10% |
| | | 3 | −34.23 | 0.22% |
| | | 4 | −48.59 | 52.73% |
| | | 5 | −69.64 | 1.47% |
| 4 | 1.6 μm (TM polarized light) | −5 | 69.64 | 0.71% |
| | | −4 | 48.59 | 2.68% |
| | | −3 | 34.23 | 1.69% |
| | | −2 | 22.02 | 15.57% |
| | | −1 | 10.81 | 1.00% |
| | | 0 | 0.00 | 35.04% |
| | | 1 | −10.81 | 7.95% |
| | | 2 | −22.02 | 20.79% |
| | | 3 | −34.23 | 0.22% |
| | | 4 | −48.59 | 7.05% |
| | | 5 | −69.64 | 1.18% |
| Gap width (μm) | 0.1664 | 0.0896 | 0.0384 | 0.2528 |
| Prism structure width (μm) | 0.0336 | 0.2544 | 0.3920 | 0.0128 |

It can be seen from the optimized results in Table 1 that the width of the gap and the width of the prism structure can be obtained according to software optimization. In practical application, in the above Table 1, the width of the gap and the width of the prism structure can also be exchanged.

Figure 3B:
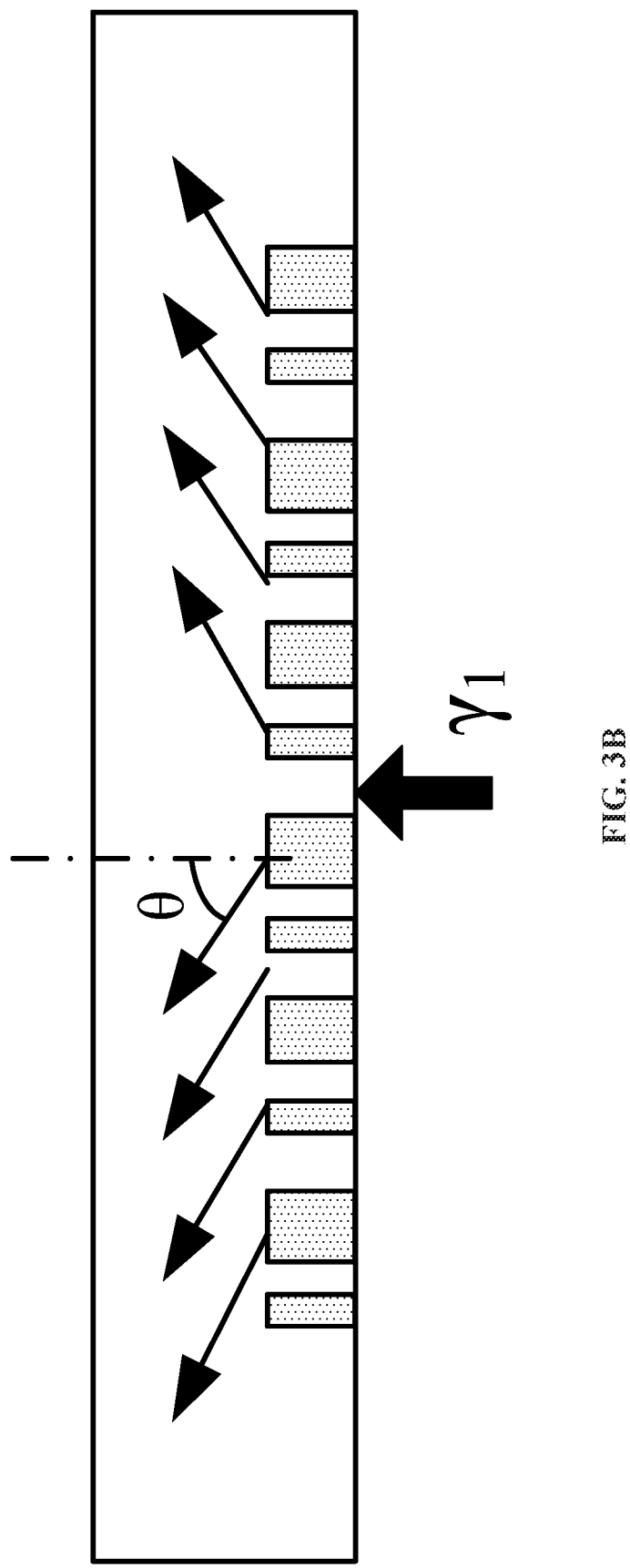
FIG. 3B is a schematic diagram of diffraction of the grating unit shown in FIG. 3A for the incident light.

FIG. 3B is a schematic diagram of diffraction of the grating unit shown in FIG. 3A for the incident light. As shown in FIG. 3B, since the light-emitting surface of the light-emitting unit is attached to the first surface of the light guide plate (i.e., the light-emitting unit is attached to the grating unit), the incident angle of the light γ1 emitted by the light-emitting unit (the incident angle is an included angle between the light γ1 and the direction perpendicular to the first surface of the light guide plate) is concentrated in a certain range centered on 0 degree, (for example, 30 degrees). The diffraction order of the grating can be adjusted with reference to the optimized results in Table 1, so that the diffraction angle θ meets the requirement of transmitting the diffracted light in the total-reflection waveguide mode in the light guide plate. It is assumed that the ratio of the refractive index of the film layer on the second surface of the light guide plate to the refractive index of the light guide plate is 0.74. When the diffraction angle is greater than or equal to 48 degrees, the light can be transmitted in the total-reflection waveguide mode in the light guide plate. Referring to the optimized results in Table 1, the diffraction order of the grating is set to ±3, ±4, and ±5 (the ratio of the three is appropriately adjusted) to reduce the sensitivity of the grating to the incident angle and polarization. Thus, the diffraction angle of part of the light emitted by the light-emitting unit meets the requirement of the transmission in the total-reflection waveguide mode in the light guide plate, and the diffraction angle of the other part of the light does not meet the requirement of total reflection. Referring to FIG. 2F, the light is emergent from a region directly facing the light-emitting unit on the light guide plate, and other regions on the light guide plate are illuminated by the light coupled by the grating and then transmitted in the waveguide mode. Further, the structure and distribution of the grating may be finely designed and adjusted according to the light-emergent distribution characteristics of the light-emitting unit (for example, the direction of the light emitted by the light-emitting unit, etc.).

For a second type of grating unit, FIG. 4A is a schematic structural diagram of one grating unit 30. As shown in FIG. 4A, each grating unit 30 comprises a plurality of sub-grating groups 301, and each sub-grating group 301 comprises a plurality of prism structure 3011b. The plurality of prism structures 3011b are attached to each other to form a stepped structure, and the heights of the two adjacent prism structures 3011b may be different or the same. The height of the highest prism structure is the thickness of the grating unit 30. As shown in FIG. 4A, each prism structure is a quadrangular prism structure, and its cross section is rectangular, that is, the prism structure 3011b has a rectangular parallelepiped structure.

Herein, as shown in FIG. 4A, gaps except the prism structures 3011b in the grating unit 30 are provided with fillers 3012b, and the refractive index of the filler is less than the refractive index of the prism structure. For example, the filler is generally a resin material, and the refractive index is adjusted by adjusting the molecular composition of the resin material. Or in a certain resin base material, high-refractive index (i.e., the refractive index is greater than the preset refractive index threshold) or low-refractive index (i.e., the refractive index is less than the preset refractive index threshold) nanoparticles are added to adjust the refractive index. The function of the grating can be achieved by the difference between the refractive indexes of the filler and the prismatic structure. When the filler having a large difference in refractive index from the prism structure is disposed in the gap, the diffraction efficiency of the grating unit for the incident light can be ensured while the grating unit is lightened and thinned.

It should be noted that the widths of the plurality of prism structures 3011b are all the same, the width of each prism structure may be 200-2000 nm, and the width is in a direction parallel with the first surface of the light guide plate. The height of each prism structure can be determined by optimization software, and the relationship between the height of each prism structure and the width of the prism structure can satisfy that the ratio of the height of any prism structure to the width of the prism structure is 0.2 to 5. Exemplarily, when the prism structure has a width of 1 μm to 2 μm, the height of the prism structure may be less than 5 μm. When the width of the prismatic structure is less than 1 μm, the height of the prismatic structure may be less than 2 μm. When the difference between the refractive index of the prism structure and the refractive index difference of the filler in the gap is larger, the prism structure having a smaller height can be used. For example, if the refractive index of the prism structure is 2, the gap is not filled with a substance, that is, when the gap is filled with air, the height of the prism structure provided may be less than 1 μm.

Optionally, each sub-grating group 301 has a width of 1 to 2 μm, that is, one grating period in the grating unit is 1 to 2 μm. It should be noted that the grating period may also be 2 to 100 μm to ensure that the grating unit can have a sufficient number of prism structures in each grating period to adjust the diffraction angle of the incident light. The larger the grating period is, the higher the required diffraction order is. The selection of the specific diffraction order can be obtained by the above formula (1).

Exemplarily, the design process and the optimization process of the second type of grating unit 30 may comprise the following steps.

S21. Environmental parameters are determined.

The environmental parameters are used to optimize a preset target to obtain attribute parameters of the grating unit, and the attribute parameters may comprise a height of the prism structure. The preset target may be the diffraction order and the optical variable of the grating unit, and the wavelength of the transmitted waves, etc.

Exemplarily, the environmental parameters may be set as follows: the refractive index of the incident medium is 1, the refractive index of the transmission medium (i.e., the light guide plate) is 1.5, the grating period is 1.6 μm, the number of the prism structures is 8, and the height of the prism structures is 0 to 1 μm.

S22. A target to be optimized is determined.

For example, the diffraction order may be selected to be 4-order, and the corresponding diffraction angle is about 49 degrees. The optical variable is the transmission coefficient of the diffraction corresponding to the transmitted waves. The wavelength range of the transmitted waves is 450 nm, and the incident angle is 0 degree. The polarized light is TE polarized light, TM polarized light, partially polarized light and unpolarized light, etc.

S23. A simulation algorithm and an optimization algorithm are selected.

The selected simulation algorithm may be any one of a rigorous coupled wave analysis algorithm, a time domain finite difference algorithm, and a finite element algorithm. The selected optimization algorithm may be any one of a genetic algorithm, a simulated annealing algorithm and a bee colony algorithm.

S24. Optimized results are output

For example, the parameters set in the above S21, and the TE polarized light and the TM polarized light set in S22 are adopted for simulation based on the rigorous coupled wave analysis algorithm selected by S23 and for optimization based on the genetic algorithm selected by S23. The obtained optimized results are as shown in Table 2.

TABLE 2

| Number of prism structures | Grating period | Diffraction order | Diffraction angle | Diffraction efficiency |
|---|---|---|---|---|
| 8 | 1.6 μm (TE polarized light) | −5 | 69.64 | 2.66% |
| | | −4 | 48.59 | 4.71% |
| | | −3 | 34.23 | 14.65% |
| | | −2 | 22.02 | 6.68% |

TABLE 2-continued

| Number of prism structures | Grating period | Diffraction order | Diffraction angle | Diffraction efficiency |
|---|---|---|---|---|
| | | −1 | 10.81 | 11.78% |
| | | 0 | 0.00 | 2.39% |
| | | 1 | −10.81 | 0.21% |
| | | 2 | −22.02 | 2.70% |
| | | 3 | −34.23 | 2.17% |
| | | 4 | −48.59 | 43.51% |
| | | 5 | −69.64 | 2.14% |
| 8 | 1.6 μm (TM polarized light) | −5 | 69.64 | 0.45% |
| | | −4 | 48.59 | 4.45% |
| | | −3 | 34.23 | 13.00% |
| | | −2 | 22.02 | 19.20% |
| | | −1 | 10.81 | 4.10% |
| | | 0 | 0.00 | 3.29% |
| | | 1 | −10.81 | 10.80% |
| | | 2 | −22.02 | 2.52% |
| | | 3 | −34.23 | 0.25% |
| | | 4 | −48.59 | 26.86% |
| | | 5 | −69.64 | 7.61% |
| Height of the prism structure (μm) | 0.651 | 0 | 0.156 | 0.968 |
| | 0.219 | 0 | 0 | 0.491 |

It can be seen from the optimized results in Table 2 that the height of the prism structure can be obtained according to software optimization.

FIG. 4B is a schematic diagram of diffraction of the grating unit shown in FIG. 4A for the incident light. As shown in FIG. 4B, since the light-emitting surface of the light-emitting unit is attached to the first surface of the light guide plate (i.e., the light-emitting unit is attached to the grating unit), the incident angle of the light γ2 emitted by the light-emitting unit (the incident angle is an included angle between the light γ2 and the direction perpendicular to the first surface of the light guide plate) is concentrated in a certain range centered on 0 degree, (for example, ±30 degrees). The diffraction order of the grating can be adjusted with reference to the optimized results in Table 2, so that the diffraction angle θ meets the requirement of transmitting the diffracted light in the total-reflection waveguide mode in the light guide plate. It is assumed that the ratio of the refractive index of the film layer on the second surface of the light guide plate to the refractive index of the light guide plate is 0.74. When the diffraction angle is greater than or equal to 48 degrees, the light can be transmitted in the total-reflection waveguide mode in the light guide plate. Referring to the optimized results in Table 1, the diffraction order of the grating is set to ±3, ±4, and ±5 (and the ratio of the three is appropriately adjusted) to reduce the sensitivity of the grating to the incident angle and polarization. Thus, the diffraction angle of part of the light emitted by the light-emitting unit meets the requirement of the transmission in the total-reflection waveguide mode in the light guide plate, and the diffraction angle of the other part of the light does not meet the requirement of total reflection. Referring to FIG. 2F, the light is emergent from a region directly facing the light-emitting unit on the light guide plate, and other regions on the light guide plate are illuminated by the light coupled by the grating and then transmitted in the waveguide mode. Further, the structure and distribution of the grating may be finely designed and adjusted according to the light-emergent distribution characteristics of the light-emitting unit (for example, the direction of the light emitted by the light-emitting unit, etc.).

Figure 5A:
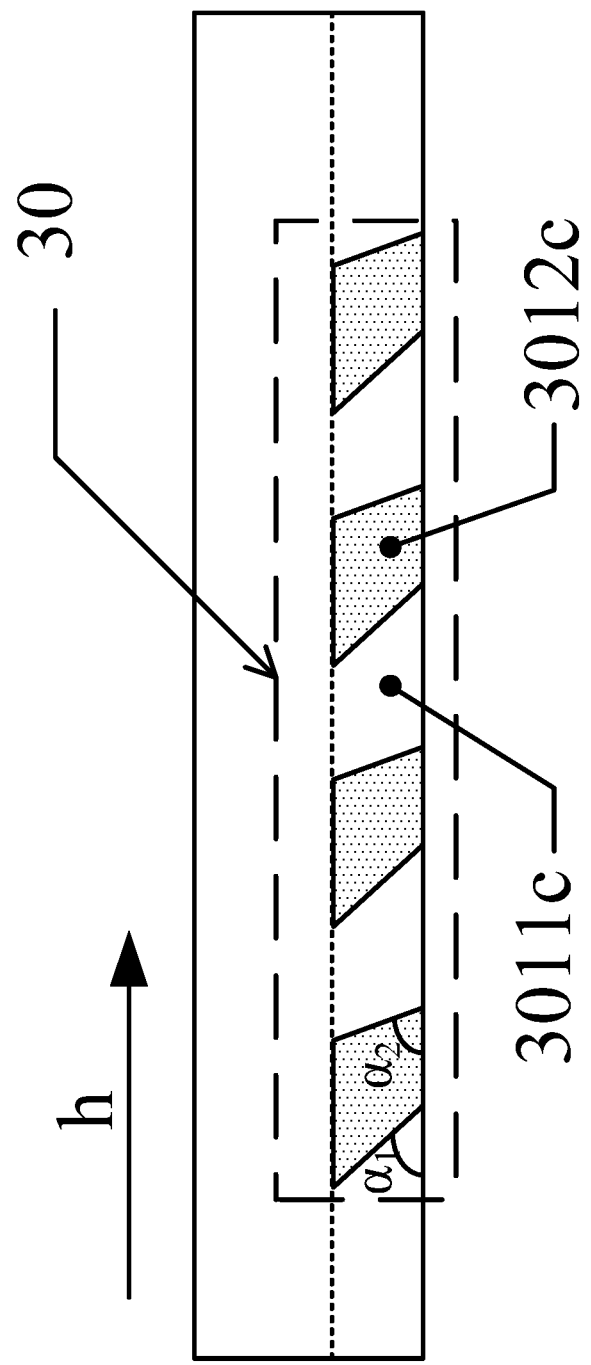
FIG. 5A is a schematic diagram of a structure of yet another grating unit provided in an embodiment of the present disclosure.
Figure 5B:
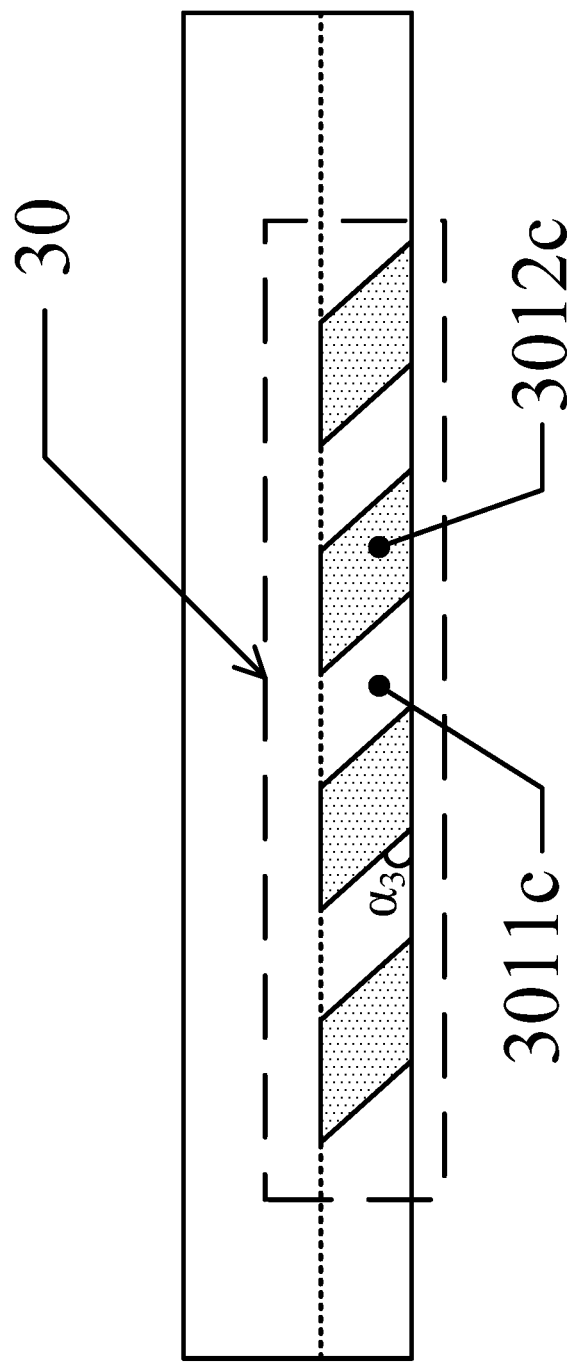
FIG. 5B is a schematic diagram of a structure of still yet another grating unit provided in an embodiment of the present disclosure.

For a third type of grating unit, FIGS. 5A and 5B are schematic structural diagrams of one grating unit 30 respectively. As shown in FIG. 5A or FIG. 5B, each grating unit 30 comprises a plurality of prism structures 3011c disposed at intervals (in the present embodiment, one prism structure is a sub-grating group). The plurality of prism structures 3011c has the same size and shape, that is, the parameters such as height and width of all prism structures 3011c are the same. The height of the prism structure 3011c is the thickness of the grating unit, and the height of each prism structure is 0.1 to 1 μm. In the third type of grating unit, the prism structure 3011c is an inclined prism structure. Optionally, the inclined prism structure refers to a prism structure of which at least two adjacent planes of the side surface are not perpendicular. Exemplarily, in the third type of grating unit provided by the embodiment of the present disclosure, the side surface comprises four planes which include two planes that are relatively parallel, and at least one slope that is inclined at an angle relative to the two planes. Further, as shown in FIG. 5A, the inclined prism structure 3011c is a quadrangular prism structure of which the side surface comprises two planes that are relatively parallel and two slopes that are inclined at an angle relative to the two planes respectively.

Herein, a gap between any two adjacent inclined prism structures 3011c of the plurality of inclined prism structures is provided with a filler 3012c, and the refractive index of the filler is less than the refractive index of the inclined prism structure. For example, the filler is generally a resin material, and the refractive index is adjusted by adjusting the molecular composition of the resin material. Or nanoparticles with high-refractive index (i.e., the refractive index is greater than the preset refractive index threshold) or low-refractive index (i.e., the refractive index is less than the preset refractive index threshold) are added in a certain resin base material to adjust the refractive index. The function of the grating can be achieved by the difference between the refractive indexes of the filler and the inclined prismatic structure. When the filler having a large difference in refractive index from the inclined prism structure is disposed in the gap, the grating unit is lightened and thinned and the diffraction efficiency of the grating unit for the incident light can be ensured.

Optionally, the width of the gap between any two adjacent inclined prism structures are the same, the ratio of the width of each inclined prism structure to the width of the gap between two adjacent inclined prism structures (duty ratio) is 0.2 to 0.8, and the width is in a direction parallel with the first surface of the light guide plate. The sum of the width of each inclined prism structure and the width of the gap between two adjacent inclined prism structures is 0.3 to 1 μm. One grating period may comprise one inclined prism structure and one gap, that is, one grating period may be 0.3 to 1 μm.

Herein, the inclined prism structure 301c may be as shown in FIG. 5A, and its cross section perpendicular to the first surface of the light guide plate is trapezoidal. At this point, the inclined prism structure 3011c may be referred to as a trapezoidal prism structure, as shown in FIG. 5A. A group of parallel sides of the trapezoidal section is parallel with the length direction h of the light guide plate, and the included angle between any one of a group of non-parallel sides of the trapezoidal section and the length direction of the light guide plate is less than or equal to 30°. The included angle between one side of the trapezoidal section and the length direction of the light guide plate is α1, and the included angle between another side of the trapezoidal section and the length direction of the light guide plate is α2. The cross section of the inclined prism structure 3011c perpendicular to the first surface of the light guide plate may also be a parallelogram as shown in FIG. 5B. At this point, the inclined prism structure 3011c can be referred to as a parallelogram prism structure, as shown in FIG. 5B. The included angle between the group of parallel sides of the parallelogram section and the length direction of the light guide plate is α3 which is less than or equal to 30°.

The diffraction order adopted by the grating unit as shown in the FIG. 5A or FIG. 5B is generally first-order diffraction (but not limited to the first-order diffraction, and high-order diffraction may also be used). The diffraction efficiency of the grating can be improved by optimizing the angle of inclination of the inclined prism structure, the height of the inclined prism structure, the duty ratio and the like.

Figure 6A:
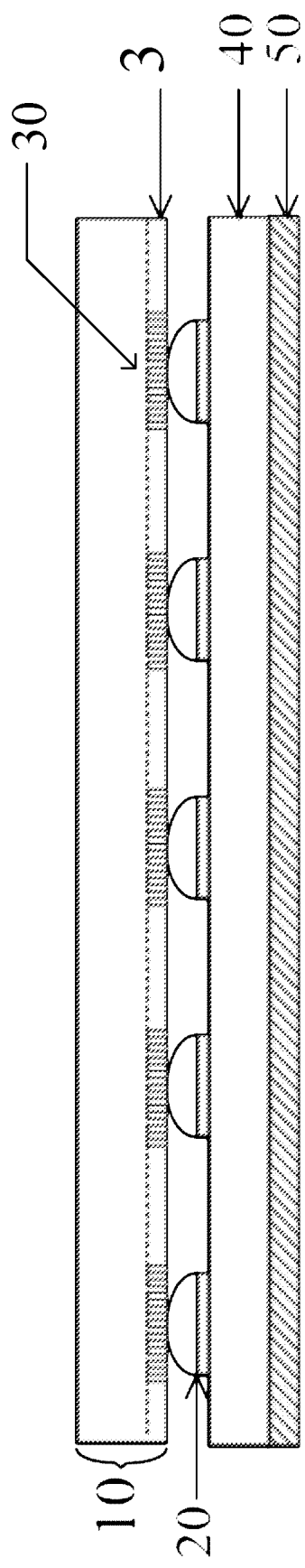
FIG. 6A is a schematic diagram of a structure of still another backlight source provided in an embodiment of the present disclosure.

As shown in FIG. 6A, the backlight source may further comprise a base substrate 40 and a reflecting layer 50. The plurality of light-emitting units 20 is sparsely arranged in array on one side, close to the light guide plate 10, of the base substrate 40. and the light-emitting surface of the light-emitting unit 20 can be attached to the first surface of the light guide plate 10 (i.e., the light-emitting unit is attached to the grating unit 30). In the related art, since the LED needs light mixing, the entire backlight source occupies larger space and is thicker. According to the embodiment of the present disclosure, the light-emitting surface of the light-emitting unit can be attached to the first surface of the light guide plate, thereby effectively reducing the thickness of the backlight source and improving the thinness and lightness of the backlight source.

Herein, the distance between two adjacent light-emitting units may be 1 to 50 mm, and the specific distance may be determined by balancing the power consumption of the backlight source with the fineness of the regional light control in product design. Each light-emitting unit may be correspondingly connected to a micro-control chip (for example, a thin film transistor (TFT) for the OLED), or a plurality of light-emitting units may be connected by other circuit wiring methods, thereby realizing the dynamic control over the light emergence of each light-emitting unit by a regional light control system.

In the embodiment of the present disclosure, the light-emitting unit may be an LED, and the LED may be an inorganic semiconductor chip, for example, a micro LED chip. The light-emitting unit may be an organic light-emitting diode (OLED). The light-emitting unit may be a laser diode (LD) of which the light emergent angle can be controlled to be very small, such as ±7°. Besides, the light-emitting unit may be an LED or LD packaged with a packaged lens. When the light-emitting unit is the LED packaged with the packaged lens, the gaps between the plurality of LEDs may be filled with a filling material to support other film layers. The refractive index of the filling material needs to be less than the refractive index of the packaged lens to ensure that the light-emergent angle of the LED is less than a preset angle which facilitates the design of the grating unit. However, too small light-emergent angle of the LED is unbeneficial for the uniforming of the light, so the preset angle can be selected to be 30 degrees.

The light emitted by the light-emitting unit may be blue light, or ultraviolet light, and may also be white light, or light of three primary colors (i.e., red light, blue light, and green light). The type and the light-emergent color of the light-emitting unit are not limited in the embodiment of the present disclosure. In practical application, the grating unit can be designed and optimized for the light of different colors.

It is should be noted that the base substrate is a transparent base substrate, and the base substrate may be a glass substrate or a flexible film. The material of the substrate is not limited in the embodiment of the present disclosure.

Optionally, as shown in FIG. 6A, the reflecting layer 50 may be disposed on one side, away from the light guide plate 10, of the base substrate 40.

Figure 6B:
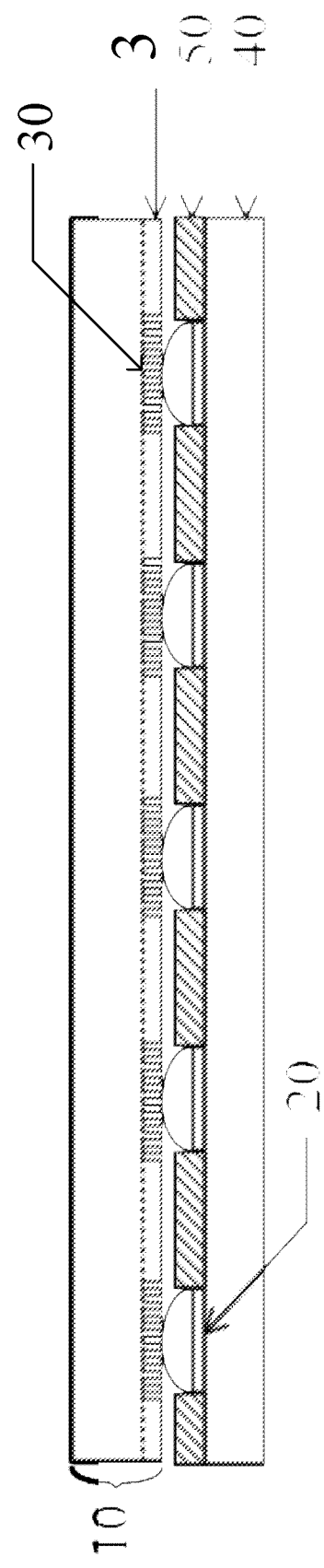
FIG. 6B is a schematic diagram of a structure of still another backlight source provided in an embodiment of the present disclosure.

As shown in FIG. 6B, the reflecting layer 50 may also be disposed in the same layer as the light-emitting unit 20. The other reference signs in FIG. 6B may refer to FIG. 6A. At this point, the reflecting layer 50 may be disposed in the region, on one side of the base substrate 40, other than the regions where the light-emitting units 20 are located. The reflecting layer can reflect the light escaping from the first surface of the light guide plate back to the light guide plate again to improve the utilization of the light.

Optionally, a reflecting layer having a thickness of 50 to 200 nm may be formed by coating a reflective material repeatedly on one side or the other side of the base substrate (the reflective material may be a metal material such as silver or aluminum), and a reflecting layer having a thickness of 0.1 to 2 mm may also be attached to one side or the other side of the base substrate. The reflecting layer may further be a multilayered dielectric film. The full-waveband reflection of visible light or the reflection of a certain colored light waveband can be achieved by film layer design. The specific design requirements can be calculated according to specific software.

Figure 7A:
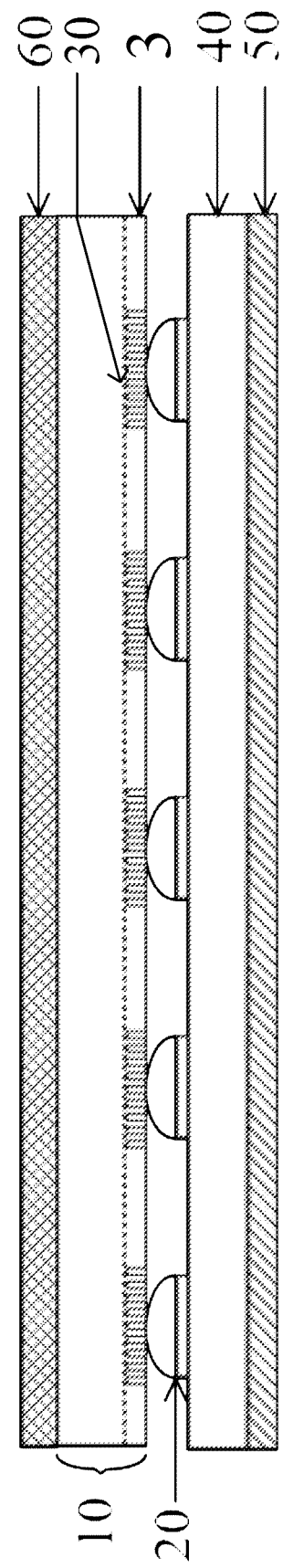
FIG. 7A is a schematic diagram of a structure of a backlight source provided in another embodiment of the present disclosure.

Further, as shown in FIG. 7A, the backlight source may further comprise: a uniform light-emergent component 60 disposed on at least one of the first surface and the second surface of the light guide plate, that is, the uniform light-emergent component may be disposed on the second surface of the light guide plate, or the uniform light-emergent component may be disposed on the first surface of the light guide plate, or the uniform light-emergent component may also be simultaneously disposed on the first surface and the second surface of the light guide plate. The uniform light-emergent component may also be referred to as a mesh point layer.

Referring to FIG. 7A, after entering the light guide plate from the first surface of the light guide plate, the light may be reflected and scattered by the uniform light-emergent component 60 and be emergent from the second surface of the light guide plate 10. The mesh points in the uniform light-emergent component may be common mesh points in the backlight source, and are generally of groove-shaped structure. The size of the mesh points is 0.1 to 1 mm. The mesh points in the uniform light-emergent component may be a specific grating structure. Generally, it is necessary to design the uniform light-emergent component for the light emitted by the light-emitting unit and the diffraction case of the light passing through the grating unit, to achieve the light-emergent uniformity of the backlight source. Usually, the uniform light-emergent component is not disposed in the position where the grating unit is located. Other reference signs in FIG. 7A can refer to FIG. 6A.

Figure 7C:
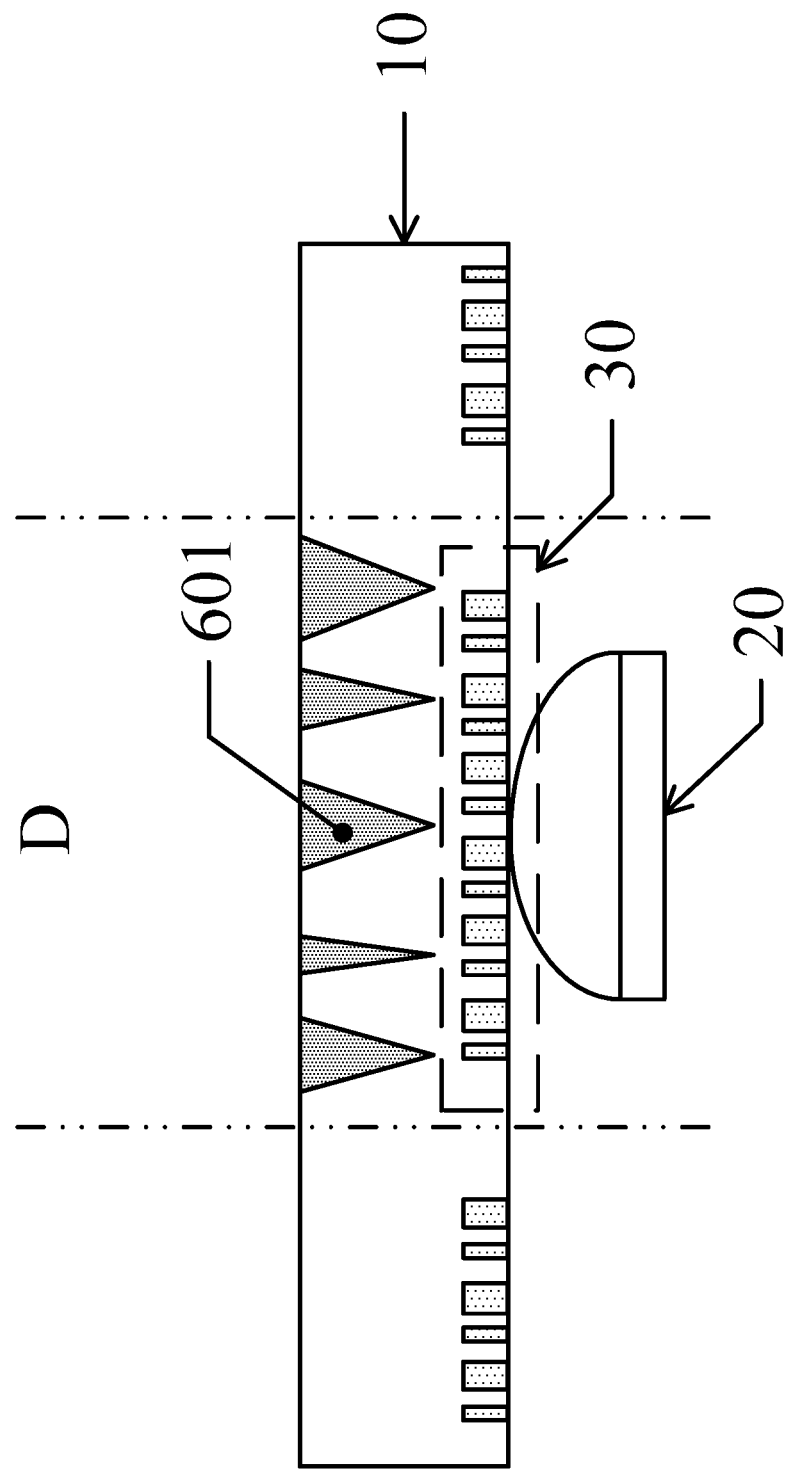
FIG. 7C is a schematic diagram of a structure of another mesh point provided in an embodiment of the present disclosure.

Optionally, as shown in FIG. 7B to FIG. 7D, the uniform light-emergent component comprises a plurality of mesh points 601 disposed at intervals. In the embodiment of the present disclosure, in order to better achieve regional light control, the uniform light-emergent component is required to have higher scattering efficiency, so that after emitted by one light-emitting unit 20 is coupled into the light guide plate 10, the light can be scattered out of the light guide plate corresponding to the light-emitting unit from the light-emergent surface of a region D of the light guide plate. Thus, the probability that the light enters the region of the light guide plate corresponding to the adjacent light-emitting units can be reduced, thereby improving the display contrast. In the figure, 30 is the grating unit.

The embodiment of the present disclosure takes the fact that the uniform light-emergent component is engraved on the light-guiding plate as an example for description. The mesh point may have various structures. The following embodiment of the present disclosure takes the following three mesh point structures as an example for explanation.

For the first mesh point structure, as shown in FIG. 7B, one cross section of the mesh point is rectangular, that is, the mesh point can be regarded as a rectangular structure, and the cross section is perpendicular to the first surface of the light guide plate. The depth of each mesh point 601 may be greater than 50 μm, so that after the light emitted by one light-emitting unit 20 is coupled to the light guide plate 10, the light can be scattered from the light-emergent surface of the region D of the light guide plate corresponding to the light-emitting unit. Thus, the probability that the light enters the region of the light guide plate corresponding to the adjacent light-emitting units is reduced, thereby improving the display contrast. The light-emergent efficiency can be adjusted by adjusting at least one of the density of the mesh point distribution and the width of the mesh points. The depth of the mesh points is in a direction perpendicular to the first surface of the light guide plate.

For the second mesh point structure, as shown in FIG. 7C, one cross section of the mesh points is triangular, that is, the mesh point can be regarded as a triangular structure, and the cross section is perpendicular to the first surface of the light guide plate. Optionally, the triangle may be an isosceles triangle, and the apex angle of the isosceles triangle is 20° to 60°. The depth of each mesh point 601 can be greater than 50 microns, and the light-emergent efficiency is generally adjusted by adjusting at least one of the density of the mesh point distribution and the size of the apex angle.

Compared with the rectangular structure, setting the mesh point as the triangular structure can make incident angle of the light incident to the mesh points smaller when the light transmitted in the light guide plate, and reduce the probability of total reflection of the light in the uniform light-emergent component. Therefore, the light-emergent efficiency can be improved.

For the third mesh point structure, as shown in FIG. 7D, one cross section of the mesh point is semi-elliptical, that is, the mesh point can be regarded as a curved surface structure, and the cross section is perpendicular to the first surface of the light guide plate. The depth of each mesh point 601 may be greater than 50 μm, and the light efficiency is generally adjusted by adjusting at least one of the density of the mesh point distribution and the shape of the curved surface.

Compared with the rectangular structure, setting the mesh point as the curved surface structure can reduce the probability of total reflection of the light in the uniform light-emergent component. Therefore, the light-emergent efficiency can be improved.

Optionally, a filler is disposed in each mesh point, and in order to further improve the scattering efficiency of the mesh points, the refractive index of the filler may be greater than the refractive index of the light guide plate. For example, the difference value between the refractive index of the filler and the refractive index of the light guide plate may be 0.5 or more, and the filler may be at least one of a rubber material with high-refractive index and an inorganic medium, such as a nitrogen silicon compound, zirconium oxide or single crystal silicon. The mesh points can also be an air mesh point, that is, no filler is disposed in the mesh points.

Optionally, the rubber material containing metal nanoparticles may be disposed in each mesh point. By utilizing the super-scattering cross-section characteristic brought by the resonance effect of surface plasmon of the metal nanoparticles (such as aluminum, silver and gold), the rubber material containing the metal nanoparticles is used to fill the mesh points, to improve the scattering efficiency of the mesh points. Meanwhile, the transmittance of the light guide plate is not significantly affected. The metal nanoparticles have a diameter of 10 to 200 nm.

When the uniform light-emergent component is disposed on the second surface of the light guide plate provided with the grating unit, a metal material may be disposed in each mesh point. The metal material may be aluminum, and the metal material is disposed in the mesh point to improve the scattering efficiency of the uniform light-emergent component.

Exemplarily, referring to FIG. 2F, the uniform light-emergent component 60 is disposed on the light-emergent surface of the light guide plate 10. The uniform light-emergent component 60 can adjust the light-emitting efficiency of the light having a diffraction angle less than the total reflection angle. Meanwhile, the light transmitted in the waveguide mode in the light guide plate 10 is taken out from the light guide plate 10 to achieve the light-emergent uniformity of the light guide plate.

Figure 8:
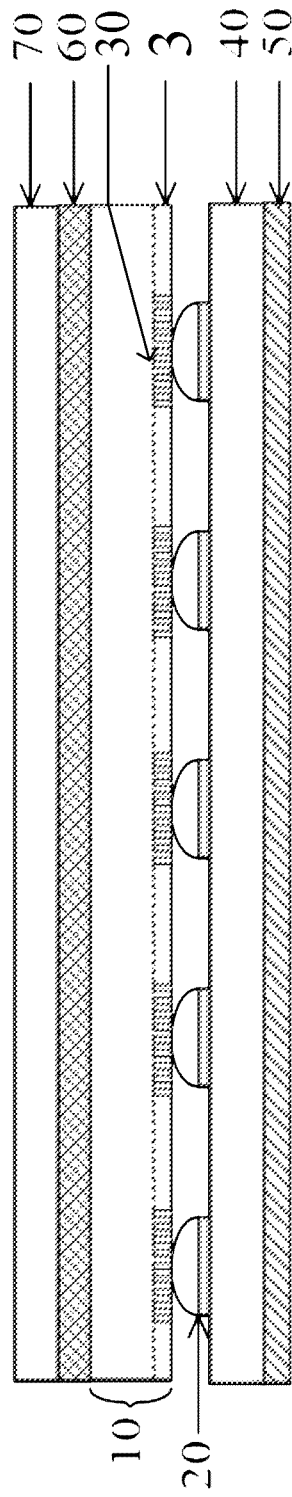
FIG. 8 is a schematic diagram of a structure of another backlight source provided in another embodiment of the present disclosure.

Optionally, as shown in FIG. 8, the backlight source may further comprise: an optical film layer 70 located on the light-emergent surface of the light guide plate 10 provided with the uniform light-emergent component 60. The optical film layer may comprise a fluorescent film, a diffusion sheet, and a brightness enhancement film. The fluorescent film may be a film filled with a fluorescent material, or may be a film filled with a quantum dot material and configured to convert the light emitted by the light-emitting unit into white light. The diffusion sheet may atomize the light to provide soft light for a display unit. The brightness enhancement film can improve the frontal brightness of the light. Other reference signs in FIG. 8 can refer to FIG. 7A.

Figure 9:
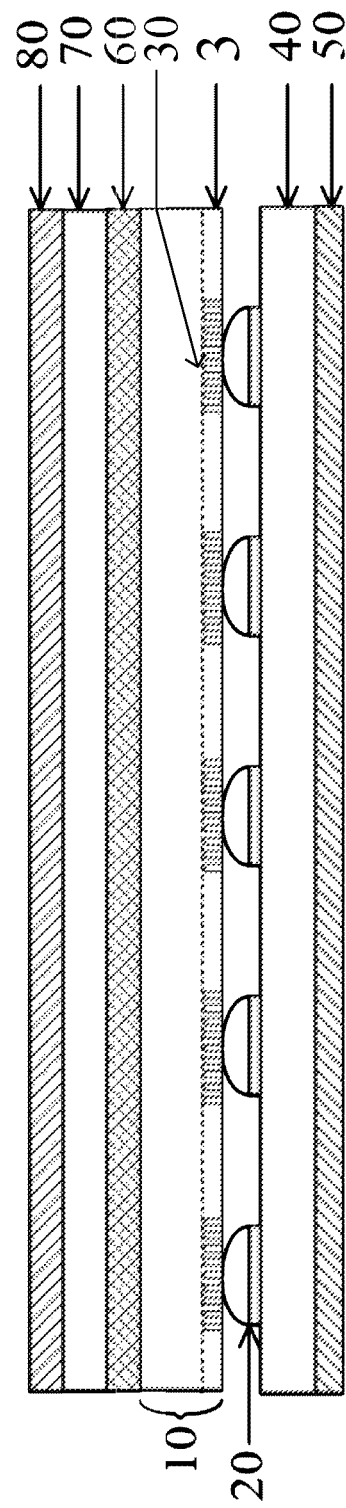
FIG. 9 is a schematic diagram of a structure of yet another backlight source provided in another embodiment of the present disclosure.

Further, as shown in FIG. 9, the backlight source may further comprise a prism film layer 80 disposed on one side, away from the light guide plate 10, of the optical film layer 70. The prism film layer is configured to further uniformize the emergent light. Other reference signs in FIG. 9 may refer to FIG. 8.

It should be noted that the backlight source may be further integrated with a backlight source control system, by which regional dimming is realized. The backlight source control system comprises: a dynamic dimming control module, a plurality of driving chips, and a voltage converting module. The dynamic dimming control module may be a digital signal processing (DSP) module. The driving chip is a driving chip of the light-emitting unit in the above backlight source, and configured to drive the light-emitting unit to emit light. For example, when the light-emitting unit is an LED, the driving chip is an LED driving chip. The dynamic dimming control module is respectively connected to the voltage converting module and the plurality of driving chips, and the plurality of driving chips is respectively connected to the voltage converting module and the plurality of light-emitting units. The dynamic dimming control module is configured to perform dimming control on the driving chips based on an image signal and a control signal, and can perform dimming control on the driving chips by adjusting an electrical signal outputted by the voltage converting module. The voltage converting module is configured to convert the input electrical signal into the electrical signal adapted to the driving chips and output to the driving chips.

In summary, according to the backlight source provided by the embodiment of the present disclosure, the grating layer is disposed on the light guide plate, and the grating layer comprises at least one grating unit. The light emitted by the light-emitting unit can diffract when passing through the grating unit and the diffracted light is transmitted in the waveguide mode of total-reflection in the light guide plate, so that the grating unit can be combined with the light guide plate to realize uniformity of the light. Since the grating unit can efficiently couple the light in the direction perpendicular to the first surface of the light guide plate emergent from the light-emitting unit into the light guide plate for transversely light mixing, that is, the light is mixed in a direction parallel with the first surface of the light guide plate. In the related art, the light is mixed in the direction perpendicular to the light-incident surface of the first layer diffusion sheet. Therefore, compared with the related art, the present disclosure can effectively reduce the distance between the light-emitting surface of the light-emitting unit and the light guide plate. For example, the light-emitting surface of the light-emitting unit can be attached to the first surface of the light guide plate. Therefore, based on light uniformity, the overall structure of the backlight source is no longer limited by the distance between the light-emitting unit and the light guide plate, and the lightening and thinning of the backlight source are realized.

Figure 10:
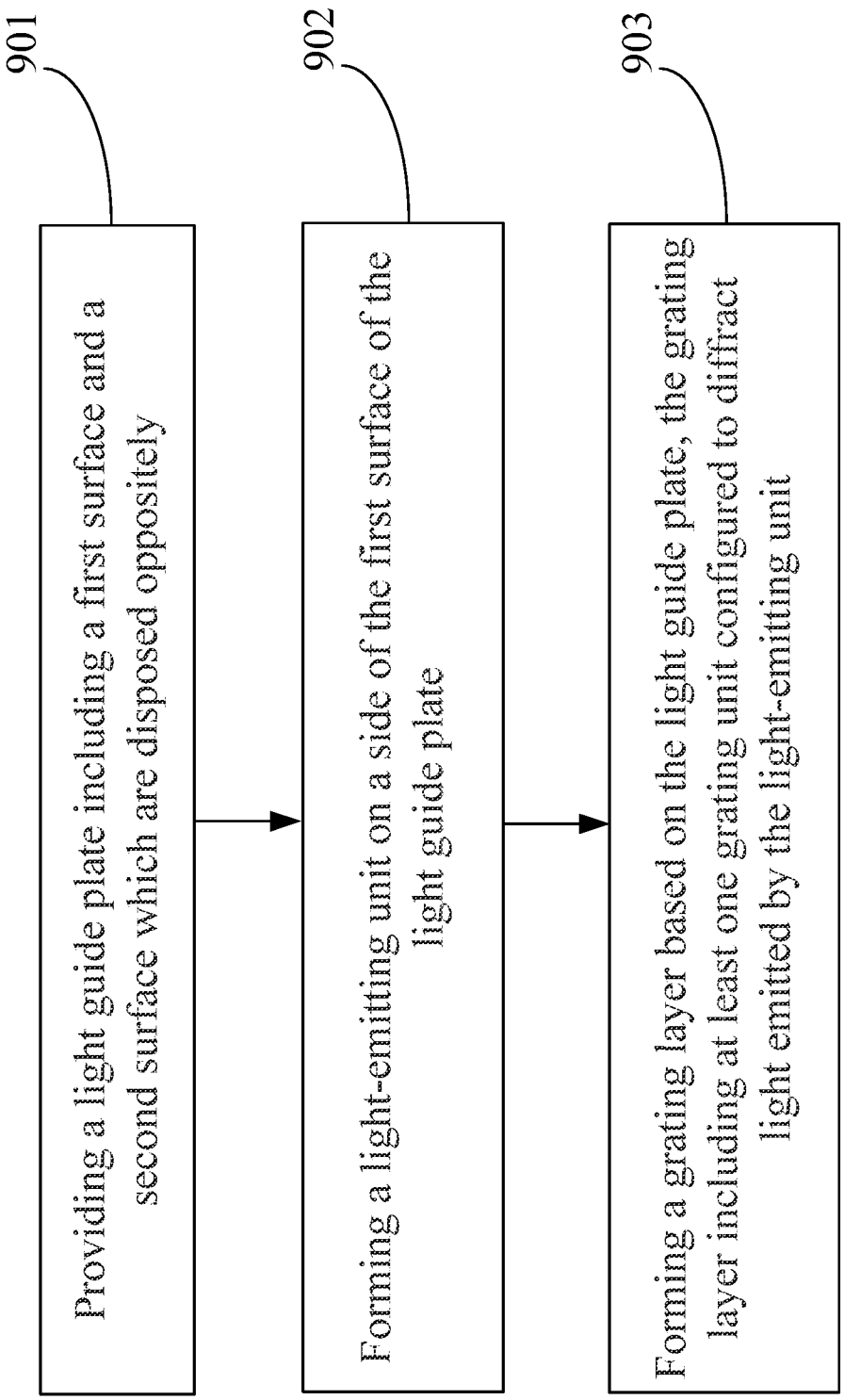
FIG. 10 is a flow chart of a method for manufacturing a backlight source provided in an embodiment of the present disclosure.

An embodiment of the present disclosure provides a method for manufacturing a backlight source. The backlight source may be a direct-lit backlight source. As shown in FIG. 10, the method may include the following steps.

In step 901, a light guide plate is provided, the light guide plate comprising a first surface and a second surface disposed oppositely.

In step 902, a light-emitting unit is formed on the side of the light guide plate where the first surface is located.

In step 903, a grating layer is formed based on the light guide plate, the grating layer comprising at least one grating unit configured to diffract the light emitted by the light-emitting unit.

Herein, the backlight source comprises a plurality of light-emitting units. The light emitted by the plurality of light-emitting units can diffract when passing through the grating unit. The diffracted light is transmitted in the waveguide mode of total-reflection in the light guide plate.

In summary, according to the method for manufacturing a backlight source provided by the embodiment of the present disclosure, the grating layer is disposed on the light guide plate, and the grating layer comprises at least one grating unit. The light emitted by the light-emitting unit can diffract when passing through the grating unit and the diffracted light is transmitted in the waveguide mode of total-reflection in the light guide plate, so that the grating unit can be combined with the light guide plate to realize uniformity of the light. Since the grating unit can efficiently couple the light in the direction perpendicular to the first surface of the light guide plate emergent from the light-emitting unit into the light guide plate for transversely light mixing, that is, the light is mixed in a direction parallel with the first surface of the light guide plate. In the related art, the light is mixed in the direction perpendicular to the light-incident surface of the first layer diffusion sheet. Therefore, compared with the related art, the present disclosure can effectively reduce the distance between the light-emitting surface of the light-emitting unit and the light guide plate. For example, the light-emitting surface of the light-emitting unit can be attached to the first surface of the light guide plate. Therefore, based on light uniformity, the overall structure of the backlight source is no longer limited by the distance between the light-emitting unit and the light guide plate, and the lightening and thinning of the backlight source are realized.

It should be noted that the grating layer provided by the embodiment of the present disclosure may be directly formed on the light guide plate body, that is, the light guide plate comprises the grating layer, and the grating layer and the light guide plate are of an integral structure. Forming the grating layer on the light guide plate body can further reduce the overall thickness of the backlight source, thereby improving the lightness and thinness of the backlight source. The grating layer may also be separately prepared and disposed on the light guide plate, which is not limited in the embodiment of the present disclosure.

Optionally, the process of forming the grating layer based on the light guide plate in step 903 may comprise the following step.

The grating layer is disposed on the first surface of the light guide plate, and the grating unit is a transmission grating unit. Or the grating layer is disposed on the second surface of the light guide plate, and the grating unit is a reflective grating unit.

Further, in the process of forming the above grating layer, there are multiple manners of forming the grating unit, and the present disclosure takes the following manners as an example for explanation.

In the first manner of forming the grating unit, the grating layer and the light guide plate are of an integral structure, and forming the grating layer based on the light guide plate comprises: forming the grating layer on the light guide plate by transfer printing or imprinting.

The second manner of forming the grating unit comprises: preparing a grating unit of the grating layer; and forming the grating layer on the light guide plate by attaching the grating unit.

Optionally, the grating unit provided by the embodiment of the present disclosure may be a whole layer structure as shown in FIG. 2A or 2B, that is, the backlight source comprises a grating unit 30 disposed on a whole layer. As shown in the FIG. 2D, the backlight source may also comprise a plurality of light-emitting units 20, and the grating layer comprises a plurality of grating units 30. The plurality of grating units 30 and the plurality of light-emitting units 20 are in one-to-one correspondence. Correspondingly, forming the grating layer based on the light guide plate may comprise the following step.

A plurality of grating units is formed on the light guide plate (any one of the first surface and the second surface of the light guide plate), such that the plurality of grating units and the plurality of light-emitting units are in one-to-one correspondence. The orthogonal projection, on the first surface of the light guide plate, of each light-emitting unit is located in the orthogonal projection, on the first surface of the light guide plate, of the corresponding grating unit. For example, the center of the orthogonal projection, on the first surface of the light guide plate, of each light-emitting unit overlaps with the center of the orthogonal projection, on the first surface of the light guide plate, of the corresponding grating unit, such that each grating unit better couples the light emitted by the corresponding light-emitting unit into the light guide plate.

The grating units are disposed in positions of the light guide plate corresponding to the light-emitting units, thereby reducing the incident light escaped from the first surface of the light guide plate, and improving the light-emergent efficiency of the backlight source.

The grating unit comprises a plurality of sub-grating groups, and each sub-grating group comprises a plurality of prism structures.

The plurality of sub-grating groups may be arranged periodically, and each sub-grating group comprises a plurality of prism structures disposed at intervals. The plurality of prism structures has the same height, and the height is in a direction perpendicular to the first surface of the light guide plate. Or each sub-grating group comprises a plurality of prism structures which are attached to each other, to form a stepped structure, and the prism structures have the same width. The width is in a direction parallel with the first surface of the light guide plate.

Correspondingly, referring to FIG. 3A, each grating unit may comprise a plurality of sub-grating groups, each sub-grating group comprises a plurality of prism structures disposed at intervals, and the heights of the plurality of prism structures are the same. Each sub-grating group has a width of 1~2 μm, that is, one grating period in the grating unit is 1~2 μm. Or, as shown in FIG. 4A, each grating unit comprises a plurality of sub-grating groups, and each sub-grating group comprises a plurality of prism structures, and the plurality of prism structures is attached to each other to form a stepped structure. Each sub-grating group has a width of 1 to 2 μm, that is, one grating period in the grating unit is 1 to 2 μm. It is ensured that the grating unit can have a sufficient number of prism structures or stepped structures in each grating period to adjust the diffraction angle of the incident light.

Optionally, referring to FIG. 5A or FIG. 5B, each grating unit may comprise a plurality of inclined prism structures disposed at intervals, and the plurality of inclined prism structures 3011c has the same size and shape. The sum of the width of each inclined prism structure and the width of the gap between two adjacent inclined prism structures is 0.3 to 1 μm. One grating period may comprise one inclined prism structure and one gap, that is, one grating period may be 0.3 to 1 μm. The inclined prism structure may be a trapezoidal prism structure or a parallelogram prism structure. The diffraction efficiency of the grating can be improved by optimizing at least one of the angle of inclination of the inclined prism structure, the height of the inclined prism structure, the duty ratio, etc.

Optionally, referring to FIG. 7A, a uniform light-emergent component may be formed on at least one side of the first surface and the second surface of the light guide plate. The uniform light-emergent component may comprise a plurality of mesh points disposed at intervals. Referring to FIG. 7B, the mesh point may have a rectangular structure. Referring to FIG. 7C, the mesh point may have a triangular structure. Referring to FIG. 7D, the mesh point may be a curved surface structure.

Optionally, referring to FIG. 6A and FIG. 6B, the backlight source may further comprise a base substrate 40. The light-emitting unit is fixed on one side, close to the light guide plate, of the base substrate. Further, referring to FIG. 8, the backlight source may further comprise a reflecting layer 50 and an optical film layer 70. The optical film layer may comprise a fluorescent film, a diffusion sheet and a brightness enhancement film. The reflecting layer is disposed on one side of the base substrate away from the light guide plate. Or the reflecting layer is disposed in the same layer as the light-emitting unit. The optical film layer is disposed on the second surface of the light guide plate.

Referring to FIG. 9, the backlight source may further comprise a prism film layer 80.

It should be noted that the sequence of the steps of the method for manufacturing a backlight source provided by the embodiment of the present disclosure may be appropriately adjusted, and the steps may also be correspondingly increased or decreased according to the situation. The varied methods that could be easily conceived by any skilled in the art within the technical scope disclosed in the present disclosure should be covered in the protective scope of the present disclosure, and therefore will not be repeated.

In summary, according to the method for manufacturing a backlight source provided by the embodiment of the present disclosure, the grating layer is disposed on the light guide plate, and the grating layer comprises at least one grating unit. The light emitted by the light-emitting unit can diffract when passing through the grating unit. The diffracted light is transmitted in the waveguide mode of total-reflection in the light guide plate, so that the grating unit can be combined with the light guide plate to realize uniformity of the light. The grating unit can efficiently couple the light, in the direction perpendicular to the first surface of the light guide plate, emergent from the light-emitting unit into the light guide plate for transversely light mixing, that is, the light is mixed in a direction parallel with the first surface of the light guide plate. In the related art, the light is mixed in the direction perpendicular to the light-incident surface of the first layer diffusion sheet. Therefore, compared with the related art, the present disclosure can effectively reduce the distance between the light-emitting surface of the light-emitting unit and the light guide plate. For example, the light-emitting surface of the light-emitting unit can be attached to the first surface of the light guide plate. Therefore, based on light uniformity, the overall structure of the backlight source is no longer limited by the distance between the light-emitting unit and the light guide plate, and the lightening and thinning of the backlight source are realized.

Persons of ordinary skill in the art may clearly understand that, for the convenience and conciseness of description, the processes in the above method embodiment may be referred to the specific working process of the units in the device embodiments, and are not repeated herein.

The embodiment of the present disclosure provides a display device, which may comprise any backlight source provided by the embodiment of the present disclosure, for example, the backlight source as shown in any one of FIG. 2A, FIG. 2B, FIG. 2D, FIG. 6A FIG. 7A, FIG. 8 and FIG. 9.

In specific implementation, the display device provided by the embodiment of the present disclosure may be any product or component having a display function, such as a mobile phone, a tablet computer, a television, a display, a notebook computer, a digital photo frame and a navigator.

Further, the display device is a display device capable of performing regional dimming, and comprises a backlight source control system, wherein the backlight source control system can realize regional dimming. The backlight source control system may be integrated in the backlight source, or may be disposed outside the backlight source. The backlight source control system can refer to the introduction in the above embodiment In summary, the display device provided by the embodiment of the present disclosure includes a backlight source. A grating layer is disposed on the light guide plate, and the grating layer comprises at least one grating unit. The light emitted by the light-emitting unit can diffract when passing through the grating unit. The diffracted light is transmitted in the waveguide mode of total-reflection in the light guide plate, so that the grating unit can be combined with the light guide plate to realize uniformity of the light. Since the grating unit can efficiently couple the light, in the direction perpendicular to the first surface of the light guide plate, emergent from the light-emitting unit into the light guide plate for transversely light mixing, that is, the light is mixed in a direction parallel with the first surface of the light guide plate. In the related art, the light is mixed in the direction perpendicular to the light-incident surface of the first layer diffusion sheet. Therefore, compared with the related art, the present disclosure can effectively reduce the distance between the light-emitting surface of the light-emitting unit and the light guide plate. For example, the light-emitting surface of the light-emitting unit can be attached to the first surface of the light guide plate. Therefore, based on light uniformity, the overall structure of the backlight source is no longer limited by the distance between the light-emitting unit and the light guide plate, and the lightening and thinning of the backlight source are realized.

The foregoing descriptions are only preferred embodiments of the present disclosure, and are not intended to limit the present disclosure. Within the spirit and principles of the disclosure, any modifications, equivalent substitutions, improvements, etc., are within the protection scope of appended claims of the present disclosure.

What is claimed is:

1. A backlight source, comprising:
    a light guide plate including a first surface and a second surface which are opposite to each other;
    a light-emitting unit on a side of the first surface of the light guide plate; and
    a grating layer including at least one grating unit configured to diffract light emitted by the light-emitting unit to enable part of the diffracted light to be transmitted in a waveguide mode of total internal reflection in the light guide plate; and
    wherein the light-emitting unit is abutted against the grating unit, an incident angle of light emitted by the light-emitting unit is concentrated in a certain range centered on 0 degree, light is emergent from a region directly facing the light-emitting unit on the light guide plate and other regions on the light guide plate are illuminated by light coupled by the grating unit and then transmitted in the waveguide mode.

2. The backlight source according to claim 1, wherein the backlight source comprises a plurality of light-emitting units, the grating layer comprises a plurality of grating units, and the plurality of grating units and the plurality of light-emitting units are in one-to-one correspondence.

3. The backlight source according to claim 2, wherein
    an orthogonal projection, on the first surface of the light guide plate, of each of the light-emitting units is within an orthogonal projection, on the first surface of the light guide plate, of a corresponding grating unit of the each of the light-emitting units.

4. The backlight source according to claim 2, wherein
    the grating unit comprises a plurality of sub-grating groups which are arranged periodically, and
    each of the sub-grating groups comprises one of the following two structures:
        a plurality of prism structures having intervals, and a same height in a direction perpendicular to the first surface of the light guide plate; and
        a plurality of prism structures being attached to each other to form a stepped structure, and having a same width in a direction parallel with the first surface of the light guide plate.

5. The backlight source according to claim 1, wherein
    the grating layer is on the first surface of the light guide plate, and the grating unit is a transmission grating unit.

6. The backlight source according to claim 1, wherein
    the grating layer is on the second surface of the light guide plate, and the grating unit is a reflective grating unit.

7. The backlight source according to claim 4, wherein the light-emitting unit is abutted against the first surface of the light guide plate.

8. The backlight source according to claim 1, wherein the grating layer and the light guide plate are of an integral structure.

9. The backlight source according to claim 1, wherein the backlight source further comprises: a uniform light-emergent component on at least one of the first surface and the second surface of the light guide plate.

10. The backlight source according to claim 9, wherein the uniform light-emergent component comprises a plurality of mesh points with intervals, and
    a cross section, perpendicular to the first surface of the light guide plate, of the mesh points is one shape of rectangular, triangular and semi-elliptical.

11. The backlight source according to claim 1, wherein the backlight source further comprises: a base substrate, and
    the light-emitting unit is fixed on a side of the base substrate close to the light guide plate.

12. The backlight source according to claim 11, wherein the backlight source further comprises: at least one of a reflecting layer and an optical film layer,
    the reflecting layer is on one of the positions of a side of the base substrate away from the light guide plate, and on one of the following layer: the same layer as the light-emitting unit and different layer with the light-emitting unit; and
    the optical film layer is on the second surface of the light guide plate.

13. A method for manufacturing a backlight source, comprising:
    providing a light guide plate including a first surface and a second surface which are disposed oppositely;
    forming a light-emitting unit on a side of the first surface of the light guide plate; and
    forming a grating layer based on the light guide plate, the grating layer including at least one grating unit configured to diffract light emitted by the light-emitting unit, to enable part of the diffracted light to be transmitted in the waveguide mode of total internal reflection in the light guide plate; and
    wherein the light-emitting unit is abutted against the grating unit, an incident angle of light emitted by the light-emitting unit is concentrated in a certain range centered on 0 degree, light is emergent from a region directly facing the light-emitting unit on the light guide plate and other regions on the light guide plate are illuminated by light coupled by the grating unit and then transmitted in the waveguide mode.

14. The method according to claim 13, wherein
    the backlight source comprises a plurality of light-emitting units, the grating layer comprises a plurality of grating units, and the plurality of grating units and the plurality of light-emitting units are in one-to-one correspondence.

15. The method according to claim 14 wherein
forming a grating layer based on the light guide plate comprises:
disposing the grating layer on the first surface of the light guide plate, the grating unit being a transmission grating unit.

16. The method according to claim 14, wherein
forming a grating layer based on the light guide plate comprises:
forming the grating layer on a second surface of the light guide plate, the grating unit being a reflective grating unit.

17. The method according to claim 14, wherein after providing a light guide plate, the method further comprises:
forming a uniform light-emergent component on at least one of the first surface and the second surface of the light guide plate.

18. The method according to claim 13, wherein forming a grating layer based on the light guide plate comprises:
forming the grating layer on the light guide plate by one of the following modes: transfer printing and imprinting.

19. A display device, comprising: a backlight source;
wherein the backlight source comprises:
a light guide plate including a first surface and a second surface which are opposite to each other;
a light-emitting unit on a side of the first surface of the light guide plate; and
a grating layer including at least one grating unit configured to diffract light emitted by the light-emitting unit, to enable part of the diffracted light to be transmitted in the waveguide mode of total internal reflection in the light guide plate; and
wherein the light-emitting unit is abutted against the grating unit, an incident angle of light emitted by the light-emitting unit is concentrated in a certain range centered on 0 degree, light is emergent from a region directly facing the light-emitting unit on the light guide plate and other regions on the light guide plate are illuminated by light coupled by the grating unit and then transmitted in the waveguide mode.

\* \* \* \* \*